United States Patent
Prasad et al.

(10) Patent No.: US 10,277,696 B2
(45) Date of Patent: Apr. 30, 2019

(54) METHOD AND SYSTEM FOR PROCESSING DATA USED BY CREATIVE USERS TO CREATE MEDIA CONTENT

(71) Applicant: The Aleph Group Pte Limited, Singapore (SG)

(72) Inventors: Venkateswaran Prasad, Dublin, CA (US); Sameer Pitalwalla, Mumbai (IN); Madhuchhanda Das, Bangalore (IN); Ragavan Natarajan, Urapakkam (IN); Abhishek Tanksali, Mumbai (IN); Ravindra Jaju, Rahatani (IN)

(73) Assignee: Intelligence Machine Inc., Dublin, CA (US)

( * ) Notice: Subject to any disclaimer, the term of this patent is extended or adjusted under 35 U.S.C. 154(b) by 100 days.

(21) Appl. No.: 15/261,925

(22) Filed: Sep. 10, 2016

(65) Prior Publication Data
US 2018/0077250 A1     Mar. 15, 2018

(51) Int. Cl.
H04L 29/08     (2006.01)
(52) U.S. Cl.
CPC .............. *H04L 67/22* (2013.01); *H04L 67/20* (2013.01); *H04L 67/306* (2013.01); *H04L 67/36* (2013.01)

(58) Field of Classification Search
None
See application file for complete search history.

(56) References Cited

U.S. PATENT DOCUMENTS

| | | | |
|---|---|---|---|
| 2003/0115354 A1* | 6/2003 | Schmidt | H04L 29/06 709/232 |
| 2004/0107261 A1* | 6/2004 | Donzis | H04L 29/06 709/207 |
| 2010/0050098 A1* | 2/2010 | Turner | G06F 17/30038 715/763 |

* cited by examiner

*Primary Examiner* — Brian Whipple
(74) *Attorney, Agent, or Firm* — Noli IP Solutions PC

(57) ABSTRACT

Large amounts of data from the Internet are collected for media content available of viewing, and user experience of audiences accessing the media content. The collected data is processed using intelligent tools and classified in a manner that facilitates searching data on the basis of time ranges. Pertinent information is extracted and presented to media content creators to enable them with the necessary knowledge to create new media content that is relevant, interesting and engaging to the creator users' target audiences, by detecting trends and changes of interest.

13 Claims, 18 Drawing Sheets

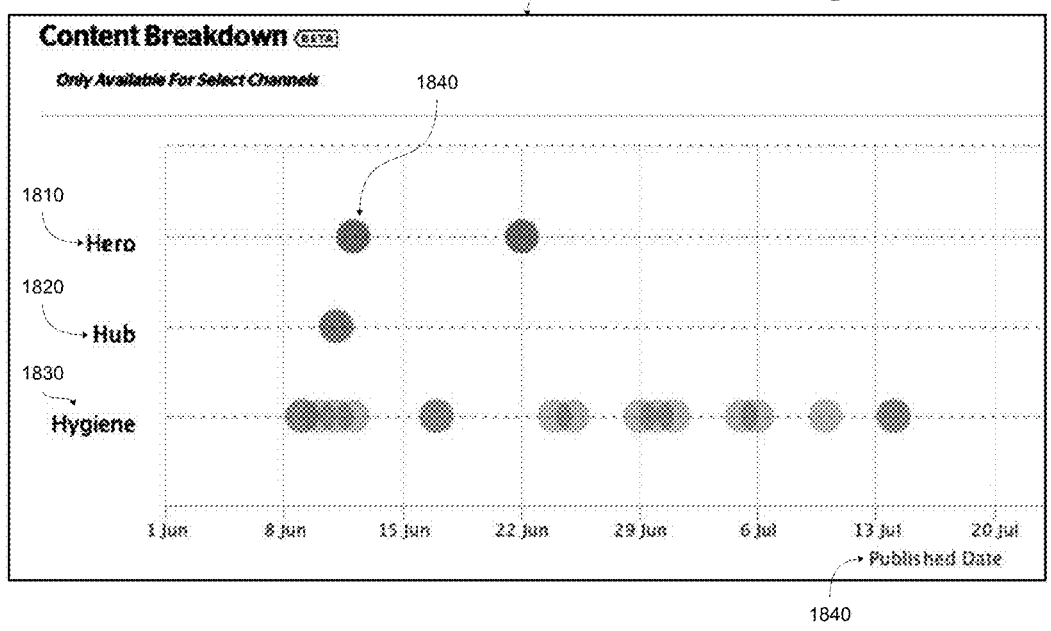

METHOD AND SYSTEM FOR PROCESSING DATA USED BY CREATIVE USERS TO CREATE MEDIA CONTENT

CROSS REFERENCE TO RELATED PATENT APPLICATIONS

The present application claims priority to U.S. provisional patent applications No. 62/217,863, and provisional patent application No. 62/217,865, both filed on Sep. 12, 2015, the content of each of which is included herein by reference. The present disclosure of the invention substantially shares its content with applications Ser. No. 15/261,909 and 15/261,928, both of which are now abandoned, the content of each of which is hereby included by reference.

FIELD OF THE INVENTION

The invention relates to collecting digital media data from a large network of distributed data sources, processing the data and serving digital media context data to creator users, more specifically the invention relates method for collecting media content data, media content viewer data and processing and presenting in groups to which humans refer as formats, in order to access the data by creative user to create new media content.

BACKGROUND OF THE INVENTION

The ease by which audiences can access digital media through networks has spurred the use of digital media as a means to directly communicate with audiences and with no delay between the creation of the media content and the delivery. In order to reach audiences and maintain a relationship with audiences (e.g., to provide marketing campaigns and/or sustain relationship with customers for a particular product), media content creators develop a resource (Channel) that can be accessed though a network, or customized communications (Electronic mail and/or messaging) to deliver media content to audience users.

For media content creators, the challenge is to develop media content that is relevant to their audience, that raises the audience attention, engaging (e.g., entices audience to take specific action in response to viewing the media content) and that is frequent enough in order to maintain an ongoing relationship. The produce content that fulfills these desired goals, the media content creators have to rely on their own creativity and experience, such as the accumulated knowledge of a given target audience for which the media content is created. Alternatively, the creator user may rely on data collected from user experience/feedback. The creator user may receive feedback from audiences that viewed previous media content and study up-to-date information on the general interests of the audience. Once media content has been delivered, there is an opportunity to monitor streaming in real-time, collecting data about which content type is being accessed by audiences, trends of interest, user's feedback (e.g., recommendations between users), geographical areas etc.

A large number of media types is being used (e.g., written text, video, music, photos etc.) by users around the world. Each media content may be associated with several attribute types (e.g., movies, TV shows, radio shows etc.). In addition to the latter media data and the associated attribute data, other types of data may be gathered and processed, such as interaction of audiences with the digital media, the feedback that users may actively provide and other user behavior data that may be collected. Given the amount of raw data that can be amassed, gathering and utilizing such data presents numerous challenges, some of which are logistical and others are due the lack of know how.

Because of the large amount of data to process and the demand of delivering results in the shortest time possible, it is unfeasible to process the data manually, and may not be productive enough to enable the media content creators to develop media content at a satisfactory frequency to maintain a productive relationship with their audiences.

However, to process data and extract useful information that may be utilized by content creator, existing technologies remain rudimentary.

Therefore, there is a need for methods and systems for collecting, processing and distributing audience data to enable media content creators to create media content that is relevant and of interest to targeted audiences and within time delays that allows media content creators to generate new media content or frequently update existing media content.

SUMMARY OF THE INVENTION

Media content creators significantly benefit from information about their audiences while creating new media content and/or updating existing one. The goal is to sustain relationships with audiences by creating media content that is relevant, engaging and of interest to those audiences. To reach these goals, the media creator needs several types of information including, for example, the media content descriptors, the level of engagement from audiences, active feedback provided by viewing audiences, and other types of information that may be collected.

The invention discloses methods for implementing on a computer system to collect data from a large number of data sources. The methods of the invention allow a system to crawl a network accessing a plurality of site at once and managing the network while still fetching relevant data connections so as not to overload the network, while obtaining data stored on a plurality of data sources.

The invention discloses novel method steps implemented in a computer system to process the collected data in a manner that enables creator users to easily access information contained in the collected data. Large amounts of collected data are processed by the system to produce statistics (e.g., aggregate numbers, statistical estimators etc.), and present the data through a graphical user interface (GUI) that enables creator users to detect areas of interest of their audience(s), and conduct multi-level searches to detect trends in the viewership. The system provides a content format classifier that identifies media content and categorizes the media data into various different clusters identified by humans as formats.

The invention identifies the metadata of each of the media content on any given repository and obtains classes of content formats. The content format of a video refers to the subtle intrinsic theme of the video examples of which include "how-to", "review", "parody", "unboxing", "commercials" etc. Classification of the media content uses keywords which the creators and media content provide as well as data entered by viewers of the media content. The keywords may be derived from other semantically relevant information available from the keywords. A set of classes is selected on the basis of all the keywords available.

The collected data from an entire repository of media content data (e.g., from all videos collected from a website such as youtube.com) is processed, and a probability is computed in order to associate each media content data (e.g., video) with one or more classes of content formats. The invention provides automatic processes based on machine learning to process large amounts of data. The invention utilizes a semi-supervised machine learning algorithm, by which, given a set of content formats (e.g., only the labels), all the necessary information about each of the content formats are learned automatically from the universe of a video repository such as "YouTube" videos which form the training set, and any input video is classified automatically into one or more content formats.

BRIEF DESCRIPTION OF THE DRAWINGS

FIG. 18 represents a user interface to present the data to a creator user and allow the user to interact with the system to obtain recommendations in the context of "Hero", "hub" and "Hygiene", in accordance with an embodiments of the invention.

DETAILED DESCRIPTION

Figure 1:
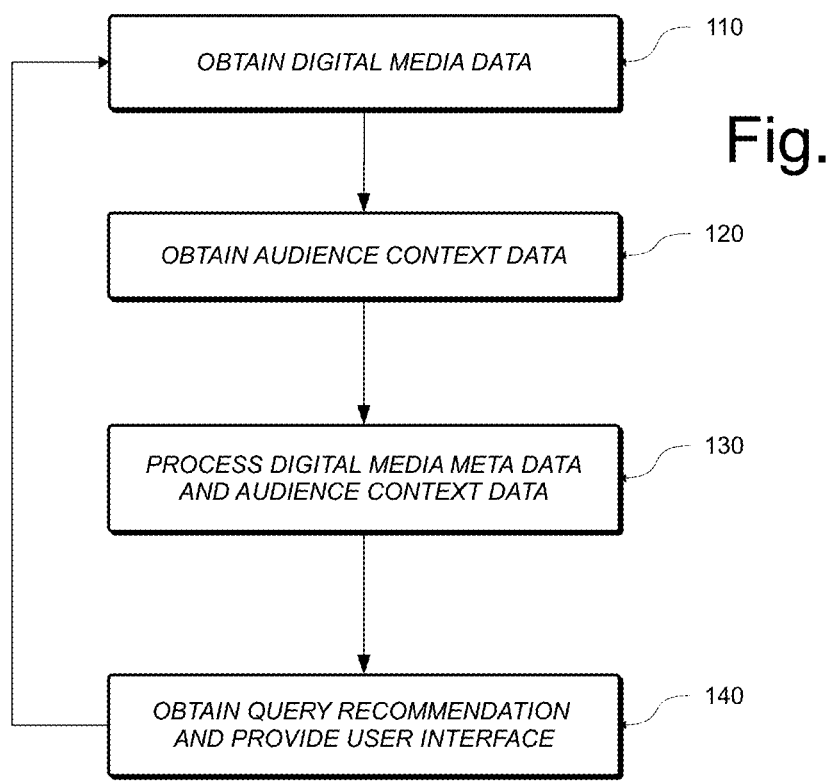
FIG. 1 is a flowchart diagram that represents the overall steps involved in providing data collection, audience data feature extraction and recommendation to creator users with the goal to build media that is of interest to a target audience.

The invention relates to method steps and a system for collecting media data, media metadata and audience experience data from a large network of data sources, analyzing the data, and extracting pertinent information that is partitioned and stored on a database in a manner that allows a creator user to query the data using time frames. Furthermore the invention obtains pertinent information for interacting with users using a learning engine that processes data collected on media content and the viewer's behavior and feedback. One or more method steps, according to the invention, may be carried out in real-time, and/or the output information may be distributed on-demand and/or be joined to specific content delivered to a creator user.

In the following description, numerous specific details are set forth to provide a more thorough description of the invention. It will be apparent, however, to one skilled in the pertinent art, that the invention may be practiced without these specific details. In other instances, well known features have not been described in detail so as not to obscure the invention.

The following detailed description is shared and refers to co-pending patent application (number: to be determined), entitled: Method and System for Generating Video Content, which is included herein in its entirety by reference.

Terminology

Unless otherwise specifically defined, terms, phrases and abbreviations used in this disclosure are commonly known in the art of information technology and computer programming and may be in use in one or more computer programming languages and the definition of which is available in computer programming dictionaries. However, the use of the latter terms, phrases and abbreviation in the disclosure is meant as an illustration of the use of the concept of the invention and encompasses all available computer programming languages provided that the terms, phrases and abbreviations refer to the proper computer programming instruction(s) that cause a computer to implement the invention as disclosed. Prior art publications that define the terms, phrases and abbreviations are included herein by reference.

In the following, systems implementing the invention, unless otherwise specifically indicated, comprise a client machine and/or server machine and any necessary link, such as an electronic network. Client machines comprise such devices as personal computers (e.g., a laptop or desktop etc.), hardware servers, virtual machines, personal digital assistants, portable telephones, tablets, or any other device. The client machines and servers provide the necessary means for accessing, processing, storing, transferring or otherwise carrying out any type of data manipulation and/or communication.

The methods of the invention enable the system, as each implementation of the invention may require, to remotely or locally query, access and/or upload data from/onto a network resource, such a World Wide Web (WWW) location using, for example, the Internet as a network.

A machine in the system (e.g., client and/or server machine) refers to any computing machine enabling a user or a program process to access a network and execute one or more steps of the invention as disclosed. For example, a machine may be a User Terminal such as a stand alone machine or a personal computer running an operating system such as, MAC-OS, WINDOWS, UNIX, LINUX, or any other available operating systems. A machine may be a portable computing device, such as a smart phone or tablet, running a mobile operating system such as iOS, Android or any other available operating system. A Host Machine may be a server, control terminal, network traffic device, router, hub, or any other device that may be able to access data, whether stored on disk and/or memory, or simply transiting through a network device. A machine is typically equipped with hardware and program applications for enabling the device to access one or more networks (e.g., wired or wireless networks), storage means for storing data (e.g., computer memory) and communicating means for receiving and transmitting data to other devices. A machine may be a virtual machine running on top of another system, e.g., on a stand alone system or otherwise in a distributed computing environment, to which it is commonly referred as cloud computing.

A "user" as used in this disclosure refers to any person using a computing device, or any process (e.g., a server and/or a client process) that may be acting on behalf of a person or entity to process and/or serve data and/or query other devices for specific information. In specific instances, an "audience user" may refer to a user accessing digital media, for simply viewing the content of the media and/or interacting with the media (e.g., writing comments, sending messages to other users regarding the media content etc.).

In other instances, the disclosure refers to a "creator user" as being a user who utilizes the output of the system implementing the invention (e.g., feedback information such as viewership statistics) to create new digital media. A "creator user" is enabled to carry out any type of data manipulation, such as filming new videos, altering existing videos or audio data or any other manipulation of digital media.

In the following disclosure, a Uniform Resource Locator (URL) refers to the information required to locate a resource accessible through a network. On the Internet, the URL of a resource located on the World Wide Web (WWW) usually contains the access protocol, such as HyperText Transport Protocol (HTTP), an Internet domain name for locating the server that hosts the resource, and optionally the path to a resource (e.g., a data file, a script file, and image or any other type data) residing on that server.

An ensemble of resources residing on a particular domain, and any affiliated domains or sub-domains, are typically referred as a World Wide Web site (or "website" in short). For example, data documents, stylesheets, images, scripts, fonts, or other files are referred to as resources.

Resources of a website are typically remotely accessed through an application called "Browser". The browser application is capable of retrieving a plurality of data type from one or more resource locations, and carrying out all the necessary processing to present the data to the user and allow the user to interact with the data.

A Browser may automatically conduct transactions on behalf of the user without specific input from the user. For example, the browser may retrieve and upload uniquely identifying data (commonly referred as "cookies"), from and to websites.

Typically, an operator of (or process executed on) a machine may access a website, for example, by clicking on a hyperlink to the website. The user may then navigate through the website to find a web page of interest. Public information, personal information, confidential information, and/or advertisements may be presented or displayed via a browser window in the machine or by other means known in the art (e.g., pictures, video clips, etc.).

In the following disclosure, communication means (e.g., websites) specialized in providing tools for users to communicate with one another, or a user with a group of other users, share data or simply access a stream of digital data, are typically referred as social media.

While describing video content in the following, "content format" may be used to refer to the category of the topic covered in a video. For example, a video may be a guide to use a machine, in which case, the video can be categorized in the "how-to" category. Similarly, other topic categories may be "review", "parody", "unboxing", "advertisement" or any other topic category.

Throughout the disclosure the term "real-time" should be construed while taking into consideration the context of data processing in which the term is used. For example, "Real-time" may refer to a time lapse of seconds of fractions thereof in the context of making network requests or accessing a record on a database; whereas "real-time" in the context of obtaining statistical aggregates data of which media content is attracting users' attention, "real-time" may refer to time lapses of hours, days, weeks or even months.

Overview of the Concept

Collecting audience feedback data is at the basis of method steps of the invention. The data may be collected through direct feedback, such as by surveying viewers of a digital content, or indirectly such as by collecting users opinions expressed through various discussions online, which may indeed be a true reflection of how they feel at the time, what interests them, what they reject etc. Several platforms may be a source of collecting audience data. Social media/forums are examples of such source.

The invention provides the tools by which a creator user can collect the data, and process the data in order to generate meaningful recommendations that help the creator user generate new media content. The goal is that the new media content made for a target audience is of high quality and captures the interest of that target audience such that the rate of success of a digital content is improved.

FIG. 1 is a flowchart diagram that represents the overall steps involved in providing data collection, audience data feature extraction and recommendation to creator users with the goal to build media that is of interest to a target audience.

At step 110, a system implementing the invention obtains the media data that may be viewed by audiences. The media data may be internally processed to obtain metadata (e.g., stored keywords), obtain image/video data of identifiable objects and/or scenes by analyzing video data (e.g., pictures of faces or architectural structures etc.), text data which may be stored as pictures of text which can be retrieved using character recognition methods, or any other type of data that may be obtained from a media content.

At step 120, embodiments of the invention collect audience data. Audience data may be any passive or active interaction of the users with the media content. Passive interaction may mean, for example, the simple viewing of a media content, the time spent viewing the media, the number of times the media was viewed by a particular viewer, the other media contents viewed in the same session or any other type of data that may be collected from the viewer without the viewer specifically contributing information. Alternatively, the viewer may actively input data (e.g., text feedback, image or video upload), which may also be collected and processed. In embodiments of the invention, step 120 may involve installing a plugin capable of gathering user experience data and communicating with a data collection resource for gathering, processing and storing the data.

At step 130, an embodiment of the invention processes the collected data, which is partitioned, indexed and stored in a database in a manner that facilitates finding results to queries submitted by creator users. Step 130 may be conducted on the data collection resource described above, and may also host a server for serving data to creator users.

At step 140, embodiments of the invention provide query recommendations, obtain queries from creator users and provide results from stored processed data. In order to provide a creator user with specific information of what to create and maximize audience interest in the media product, embodiments of the invention provide what will be referred herein as Content Recipes. Content recipes enable creator users perform at least the following tasks: a) Identify which content formats are performing well for an industry/domain of concern; b) Break the content formats down to a time-sliced window to identify patterns or emergence of patterns; c) obtain a detailed breakdown of which formats are doing well from a viewership or engagement standpoint; and d) Identify any emerging content format which is rising in popularity with a target audience, so that a determination can be made whether to invest in that emerging format.

Moreover, embodiments of the invention further enable creator users to build upon past experiences with audience and plan a strategy to make regular and frequent provision of content, which media is varied and enticing to keep contact with the media channel/source.

The invention provide method steps, which may be implemented in a system, as an Extensible Multithreaded Data Gathering Framework that aims to address several challenges that arise when gathering large amounts of data, such as when collecting a list of brand names whose communication sources (e.g., Facebook page) needs to be retrieved, or a list of videos whose statistics needs to be fetched from one or more repositories on the Internet (e.g., YouTube), or any other textual data whose relevant information needs to be retrieved from the Internet. An embodiment of the invention may implement the extensible multi-threaded data gathering framework by means of a plugin-based extensible architecture delegating the site-specific responsibility to the plugin while at the core providing a fault-tolerant multi-threaded service on which the plugins are run to gather the data from the web.

System for Collecting and Processing Digital Media Audience Data

Figure 2:
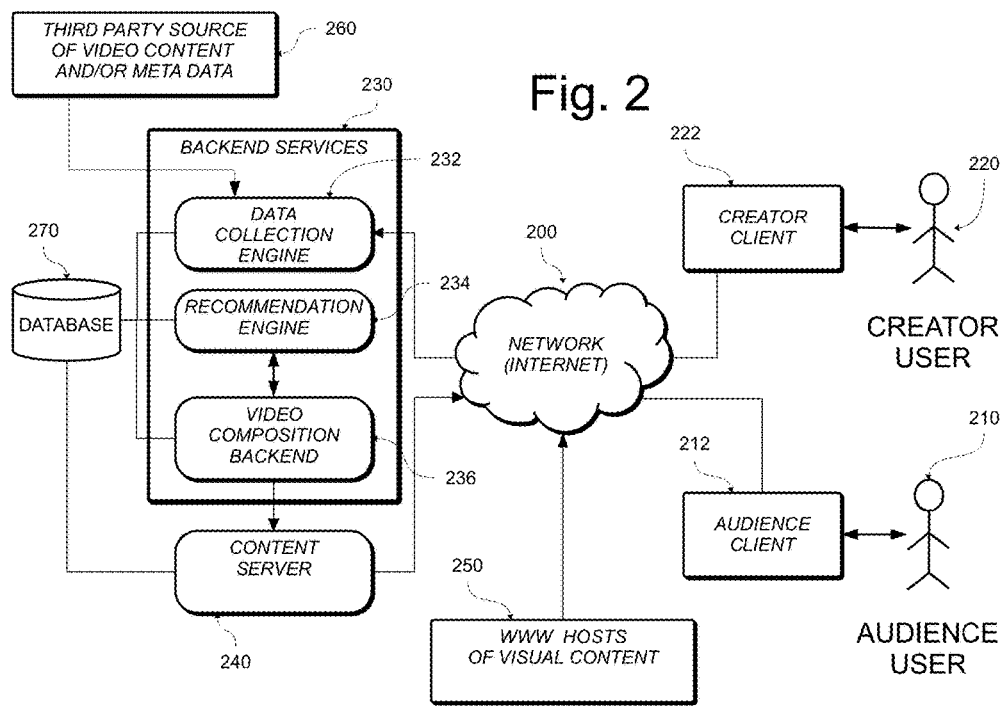
FIG. 2 is a block diagram representing a system for collecting and processing data and providing input to creator users in accordance with an embodiment of the invention.

FIG. 2 is a block diagram representing a system for collecting and processing data and providing input to creator users in accordance with an embodiment of the invention. Each block in FIG. 2 represents sets of system components (software and hardware) and method steps embodied in computer program code that when executed achieve the functional results as described below. The several components may be localized in a single machine or distributed across multiple machines, sites and/or platforms. The latter machine may remotely communicate over a network (e.g., 200) such the Internet.

A system embodying the invention comprises backend services components (e.g., 230) for collecting, processing, storing and retrieving data; a recommendation engine (e.g., 234) for receiving queries from creator users (e.g., 210); and back-end media content composition (e.g., 236) for enabling creator users to generate new media content. The data may be collected from third party sources of media content data (e.g., 260). The data may be collected from plugin/application components that are executed on a plurality of audience user machines (e.g., 212). The data is preferably stored in a database (e.g., 270), which designed with novel indexing method steps that allows for retrieval of data optimal for the creator user to access the most pertinent information for creating new media content.

The system comprises a data collection engine 232 comprising the system components that collect data, organize the data in order to facilitate further processing. The data collection engine obtains more data about a set of input data from the world wide web. The set of input data comprises all metadata and media statistics data (e.g., number of views, number of likes etc.) about all videos present in the digital space (e.g., 250), online activity of users on any data source (e.g., contributed activity data on online usergroups) to understand their current behavior and interests, topical events which are the topic of interest of the target data source (e.g., usergroup). For example, the audience user data may be collected in real-time as the viewers retrieve the media content and as they input comments, discussion, simultaneously or successively visit other media content or carry out any other behavior that may be associated with the access to a particular media content.

The data collection engine may also retrieve data from third party providers (e. g., 260). The latter may be one or more repositories that contain information about any particular media stream, audience data or any other type of data that may be pertinent for the data collection and processing as provided by implementations of the invention. For example, the third-party repositories may provide data indicating which type media content, topic or any other data distributed to users are showing an increase (or decrease) in interest. The latter is typically referred a "trending" in the distribution of media content.

A system according to the invention comprises a set of (software and hardware) components that enable the system to process the collected data and build a back-end resource to allow the system to make recommendations to a creator user to generate new content.

A system according to the invention comprises a video composition back-end, which is a set of (software and hardware) components that enable a user to produce digital content. A creator user, for example, is able to use the system to learn about the content a target audience is watching, what different kind of content is appeasing to the various audience fragments or any other information that may lead a creator use in generating content of interest to a give audience.

Data Collection Methods

Embodiments of the invention obtain a maximum amount of input data (e.g., media) from the world wide web. While the underlying task is common, which is to obtain information about a set of data from the world wide web, a program doing so could face many challenges. For example, the input data set could often exceed hundreds millions of records demanding a main system memory capacity that exceeds feasible limits. In addition, accessing a target data source on the Internet may need to comply with restrictions such as the maximum number of requests per second it may be served, and/or total number of requests per day, etc, which may be imposed by the source of data (e.g., third-party data sources). A page may in addition demand other information/actions, such as constantly refreshing security tokens needed for authorization etc.

Data collection may face other challenges, such as arbitrary timeouts that could occur for various reasons including server errors, client errors, errors caused due to network outage etc. In addition, the dynamic behavior of certain websites might demand the data gathering code to take certain actions in order to be able to retrieve certain information. For example, it might paginate the results with token identifications, forcing the data retrieval code to repeatedly request the pages that provide token identifications to be able to reach the proper content.

Embodiments of the invention implement a set of novel methods to crawl a network in order to collect data. Crawling refers to the process of sequentially accessing network resources (e.g., data on a website). Accessing network resources may be simultaneously carried out from a plurality of processes executing on a given machine or (e.g., in a distributed environment) launched from several machines. The process of gathering data (i.e. crawling) must be managed in order to maximize the speed of data collection and the amount of data while minimizing the load put on the network.

The methods of the crawler in accordance with embodiments of the invention may involve gathering the resource locations (e.g., web site URLs), creating queues of network connections in order to send requests to any specific URL, and managing the queues of connections in order to optimize network traffic and avoid overloading the network. The methods are implemented within a framework designed to facilitate development of software components, and further allows to expand functionality of the software to grow the set of tools offered by a system implementing the invention.

The system, according to the invention, may be configured to carry out any kind of web-crawling while minimizing the amount of program code (no more than few tens of lines) could be written and be plugged in this architecture. The user can configure the limits (such as the number of HTTP requests per seconds) at which to crawl.

The uniqueness of this crawler is its ability to read the input from an input-stream to construct similar outgoing HTTP requests with varying set of input parameters (such as video id.) and its ability to do it in fixed batch size. For example, the framework may read the input data as a stream from text file in batches into memory, wherein a typical batch size may be less than 100 entries. This makes it possible to deal with very large number of records at input.

When a response is received for some items in the batch, new items are added to the batch without waiting for the entire batch to complete (the batch can be seen as a sliding window from begin to end in the input stream of request ids—as soon as one is complete, causing the batch size to drop, the next one is taken immediately for processing). The latter ensures that the batch size remains constant throughout the run. Failed requests can be retried as many number of times as the user wants before being marked as permanent failure (for valid reasons). The failed requests may be tried only after all the input in the input-stream is exhausted.

Figure 3:
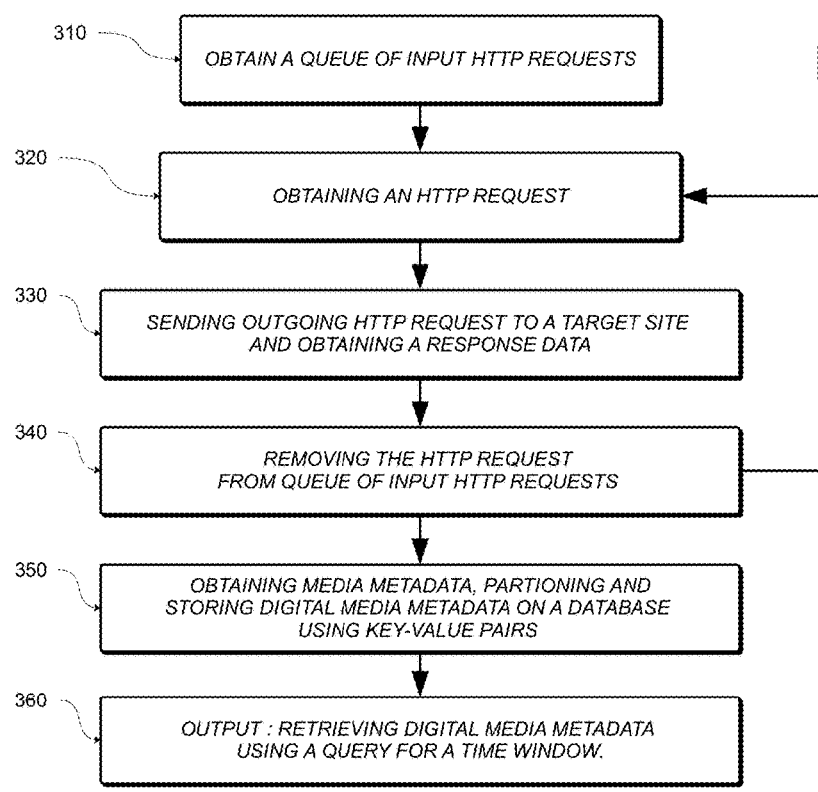
FIG. 3 is a flowchart diagram illustrating method steps for gathering and storing digital media metadata in accordance with an embodiment of the invention.

FIG. 3 is a flowchart diagram illustrating method steps for gathering and storing digital media metadata in accordance with an embodiment of the invention. At step 310, an embodiment of the invention may load a plurality of input HyperText Transport Protocol (HTTP) request data from at least one data stream into a computer memory as at least one batch for processing. Input HTTP request data may be loaded as batches of from one or more of text files, database queries, network storage locations or any other source for obtaining data. Batches of input request data may be set to maximum size so as to avoid overloading a system embodying the invention carrying out the crawling steps.

At step 320, the system obtains a HTTP request from said plurality of input HTTP request data. The HTTP request may contain a target site data and further optionally contains at least one varying request parameter. An outgoing HTTP request may be constructed by modifying the parameters of request to seek a specific type of data. The outgoing HTTP request may be modified by adding to it an identifier for identifying a video media content on a target site.

For example, the outgoing request can be modified to adapt to then-current operating conditions or restrictions imposed by the target server that is being sent the request. For example the requested number of response elements expected in a response can be modified in order to maximize the information content in the response relative to the amount of request quote units consumed in response processing.

Below is an example of the type of processing that may be undertaken in generating an outgoing HTTP request. In a message-driven queuing mechanism where a job in the queue contains a message (record) to be processed, the message is the source of parameters required to execute the request. A worker job picks the message from the queue and creates an outgoing HTTP requests and executes the query.

A typical outgoing HTTP request may contain the following elements:

{operation} {protocol} {domain} {endpoint} {endpointversion} {entity} {dimension/parts} {parameters}

{operation} refers to operation instructions destined for the server e.g., GET, POST, DEL. To fetch data a GET query operation may be used.

{protocol} refers to the network access modality for communicating with a server e.g., HTTP and or HTTPS {domain} is a network domain name which is used to identify the numerical reference of server on a network. Numerical references (e.g., Internet Protocol addresses may be directly used for the latter identification.). For example a the domain name may be "www.googleapis.com"

{endpoint} refers to the api endpoint of the primary source. For example, an endpoint called "youtube" may be used to reach the youtube endpoint via google api.

{endpointversion} refers to the version of the endpoint being accessed. e.g. "v3" may refer to version 3.

{entity} refers to the actual object/entity for which we are interested to fetch data. E.g. 'videos' is the api that we will use to fetch data around videos object {parameters} refers to a plurality of parameters that be passed to the server. For example, {dimension/parts} may represent the dimension of the api identity. This is selected as per the crawler logic and can vary in order to ensure the rate limits are respected with every outgoing HTTP call; {fields} like parts or dimensions we might choose specific fields of interest for a particular call. This is selected as per the need of the respective crawler and defined by the application's logic; {entityid} the identifier that identifies the entity; {authkey} the availed authorization key for making the HTTP call.

A typical request may be formatted as follows: "GET https://www.googleapis.com/youtube/v3/videos?part=snippet&id=ID&key=APIKEY"

At step 330, a system embodying the invention sends out the outgoing HTTP request to a target site. In response the system may receive a response, which returns data containing a digital media metadata. If the connection request to a target resource fails, the system may retry the connection request for a set number of times. If after a number of trials, the specific entry from the a batch of input requests may labeled as a permanent failure.

Embodiments of the invention may throttle outgoing HTTP request per time unit in order to avoid overloading any particular target site.

Moreover, in sending out connection requests, an embodiment of the invention may manage one or more queues of connections each queue is filled with a plurality of requests to be connected. Instances are created to handle each request. At step 340, an embodiment of the invention removes the request from the queue and loads one or more input HTTP requests from one or more data streams into the queue.

Request queues decouple the request processing—the mechanism of constructing a specific request in the appropriate request format and encoding from the intent, sequencing, and rate of requests. The sequence of requests in the queue determine the sequence of constructed requests by the downstream request constructor. Periodic requests for the same requested resource, in order to ensure requests meet a certain Service Level Agreement for requested resource coverage in a given time interval, can be specified by carefully inserting request intents for those resources in the queue at intervals and multiplicities that approximate the end desired request issue rate.

At step 350, an embodiment of the invention stores the collected data on a database. using key-value pairs and partitioning said digital media metadata according to a time series, wherein a partition contains said digital media metadata of a given time interval and further using a high-level index that uses time intervals to index each of said key-value pairs. Embodiments of the invention utilize a novel method of storing data in the database, which utilize time-series built on top of key-value pairs. The data to be stored is partitioned by time window (typically a day). A high level index containing the names of the partitions is maintained at memory which allows the user to get the data corresponding to a given time (in this case, a given date). This index is maintained as a TreeMap (which is a sorted map which allows traversing to the subsequent elements in the key).

At step 360, an embodiment of the invention may retrieve data within a time frame. A user may access records within a time frame, by traversing the list of a query from start to end. A high-level index may be maintained as a tree map having sorted elements, thus traversing each element leads to the subsequent element in a list until the end of the list.

This will give the list of individual partitions for each of the time unit (typically, a day). Step 360 may be implemented in a multi-threaded architecture which allows for retrieving data corresponding to the input key from each of the databases concurrently.

The databases may be kyotocabinet .kct files containing key-value pairs. KyotoCabinet is an advanced open-source implementation based on QDBM that offers a whole array of different kinds of underlying storage (both in-memory and permanent) options for key-value pairs that can scale up to 8 exabytes (8000000 Terabytes).

Since this entire database utilizes logical volume management (e.g., LVM 2), where multiple hard disks are striped to form a single large storage area, the data is distributed across the independent disks, which enhances concurrent retrieval of data. In embodiments of the invention, using the latter data storage distributed scheme, a increase of the amount of queried data and/or the complexity of the query itself, which lead to the an increase of number of input/output operations involved for a time series, is carried out over a larger number of disks, thus, resulting in faster operation.

The crawler system of the invention may be implemented as an extensible multithreaded data gathering framework using plugin-based extensible architecture. A system implementing the invention may provide at its core a fault-tolerant multi-threaded service for executing and managing instances of any number of plugins. The core is enabled to handle failures, for example, by maintaining a separate pool of failed threads that may be retried at a later time following specified parameters. Parameters such as the number of retrial attempts etc., may be pre-configured or determined from the execution context. The latter architecture allows for delegating site-specific required functionality to specific plugins for accessing any specific target location. The latter framework confers to embodiments of the invention significant advantages such as the the ability to implement target specific requirements within the plugins, thus, each plugin may handle the requirements imposed by the targets, such as, maximum number of requests per seconds, authorization tokens etc.

Figure 4:
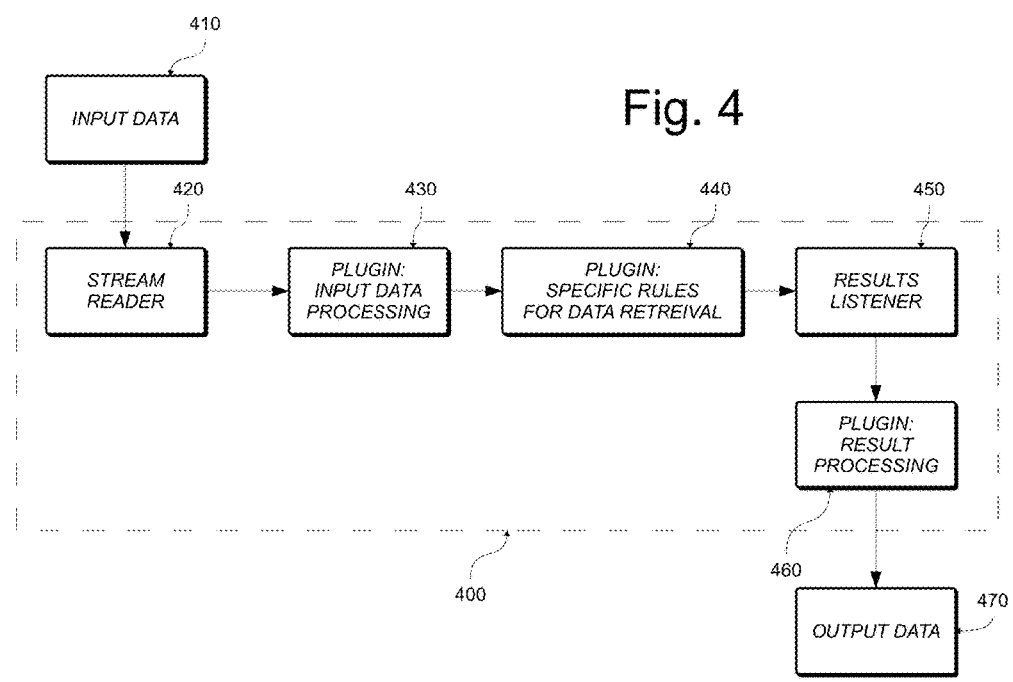
FIG. 4 is a block diagram representing functional components of the system implementing the extensible multi-threaded data gathering framework in accordance with an embodiment of the invention.

FIG. 4 is a block diagram representing functional components of the system implementing the extensible multi-threaded data gathering framework in accordance with an embodiment of the invention. Each component of FIG. 4 represents a set of software code for implementing the methods as described above to collect and process data. The arrows symbolize the flow of data from one component to the next in progression of processing.

Block 410 represents a set of data sources. For example, the location data may be stored in a text file, database, network connection or any other data source location. The system is implemented with software components to access the data and transparently feed input data to the system for processing.

Block 400 represents components of the system according to the framework described above. Block 420 represents software components that enables the system to handle input data and provide streams of data (e.g., URLs data) that can be used by other plugins to crawl sites and access network resources. Block 430 represents software components that process the input data. For example, input data may be used to construct queries, which may involve modifying the input data by adding/removing any specific information to/from the input data. Block 440 represents software components of the system that implement the steps of further implementing specific rules for data retrieval. For example, using the input to determine the target site, the system may determine the specific plugin to invoke for accessing the site. The system may create and manage queues for plugin instances to be created, create and manage queues for instances under execution, and create and manage queues for instances that has returned results or failed to return results.

Block 450 represents software components that enable the system to receive results of the queries. The later may determine whether a query has been successfully executed, failed or needs to be retried.

Block 460 represents software components for handling the results obtained from the crawler's queries. For example, query results may contain several types of data (e.g., metadata, audience feedback etc.) that must be categorized prior to sending the data out to a storage medium and/or to other system components for further processing.

Block 470 represents software components for handling output data streams. The latter may involve further processing for storage. such indexing the data prior to storing the data on a database.

Figure 5:
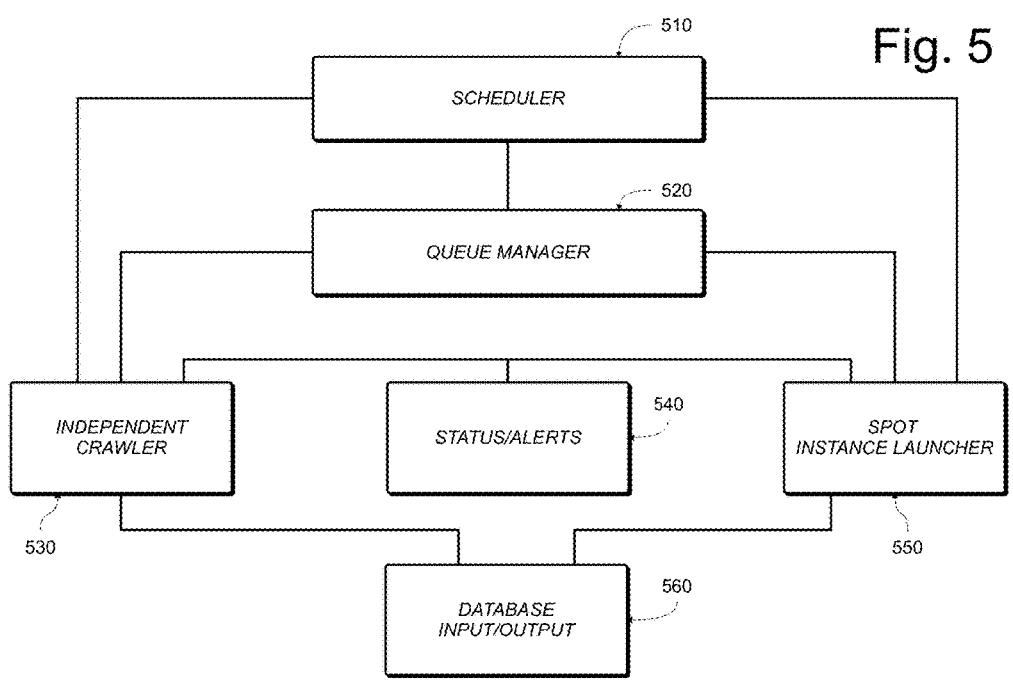
FIG. 5 is a block diagram representing components of a data collection crawling system in accordance with an embodiment of the invention.

FIG. 5 is a block diagram representing components of a data collection crawling system in accordance with an embodiment of the invention. A crawler system embodying the invention may comprise a scheduling system (e. g., block 510), a queue management system (or queue manager) (e. g., block 520), a crawler process instantiation and management system (e.g., block 530), an instance launcher system (e. g. block 550), a status and alert process management system (e.g., block 540) and data input/output system. The latter crawler system components of FIG. 5 will be described in further detail below.

Figure 6:
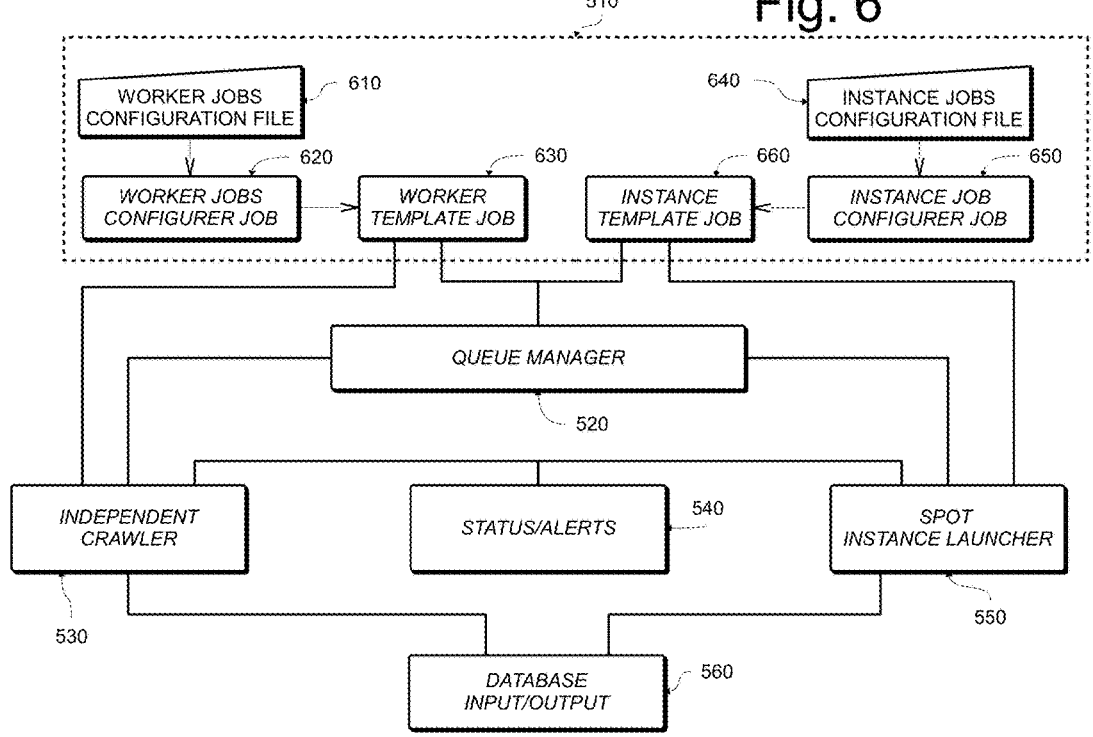
FIG. 6 is a block diagram representing components of a data collection crawling system further detailing a scheduling system in accordance with an embodiment of the invention.

FIG. 6 is a block diagram representing components of a data collection crawling system further detailing a scheduling system in accordance with an embodiment of the invention. The scheduling system 510 comprises software components that enable the system embodying the invention to schedule crawling jobs. A worker job configuration component 620 may utilize a configuration data source 610 (e.g., configuration file) and a worker template 630 to generate and schedule a worker process. A worker process encapsulates mechanisms to address a specific information source using a specific communication protocol particular to that source and issue a request to that source that translates a request intent into the actual request encoding in the communication protocol. The existence of a worker process achieves a separation of concerns between request intent and request construction and issuance and allows the latter to be independently scaled through the judicious selection of an appropriate number of worker processes.

An instance job configuration component 650 may utilize an configuration data source 640 (e.g., configuration file) and an instance template job to generate and schedule an instance job. An instance process encapsulates a macro level crawl intent through aggregating and providing the means of control and coordination between multiple worker instances. These aggregates can be homogeneous or heterogeneous sets of the same or different type of worker instance. It thus allows a logical unit of information desired, to be mapped to one or more request types from one or more source types and organized and controlled as a single unit, enabling ease of use and fine grained control.

Figure 7:
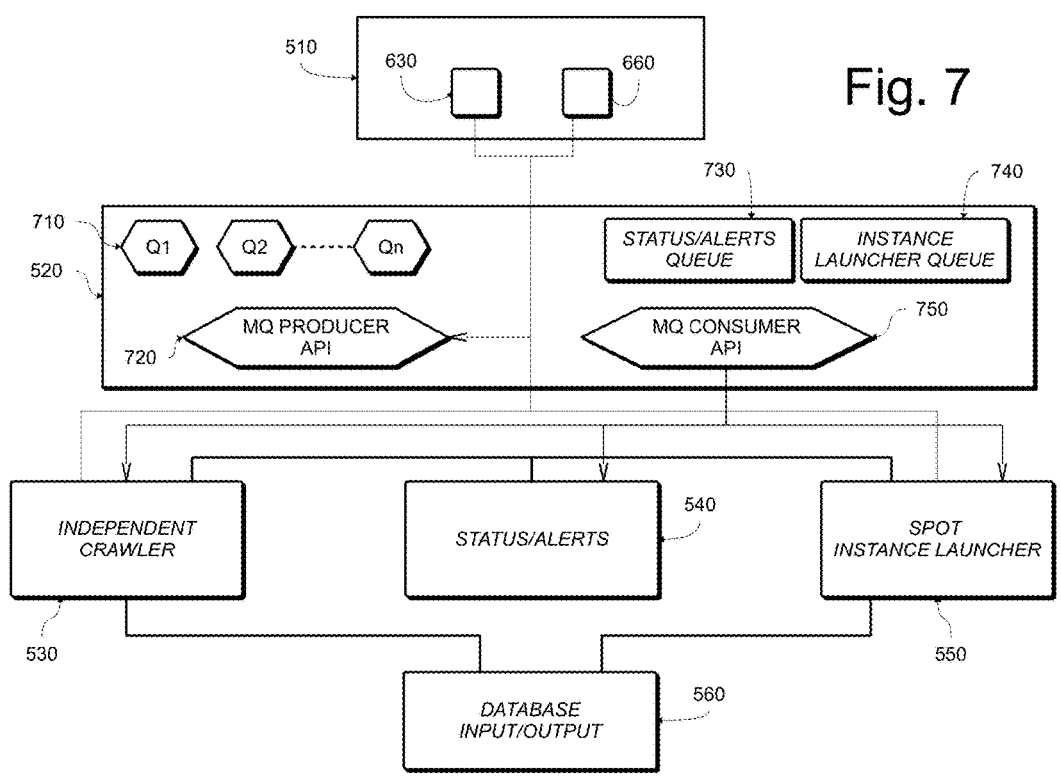
FIG. 7 is a block diagram representing components of a data collection crawling system further detailing a queue management system in accordance with an embodiment of the invention.

FIG. 7 is a block diagram representing components of a data collection crawling system further detailing a queue management system in accordance with an embodiment of the invention. The queue management system 520 provides an application programming interface (API) component 720 for enabling crawling process instances and instance launcher instances to be interfaced with instance queues. The queue management system 520 provides an API 750 for enabling instance launcher process instances 830 and status/alert process instances 820 to be interfaced with instance launcher process queues and status/alert process queues, respectively. The queue management component provides a single-lever mechanism to control multiple aspects of the request construction and issue process, specifically with reference to the sequence, repetition, and rate. It thus allows independent control over request ordering and request throughput.

Having a single control element in the form of a request queue simplifies the control and management of the system in general as multiple facets of control can be exercised using a single mechanism.

Figure 8:
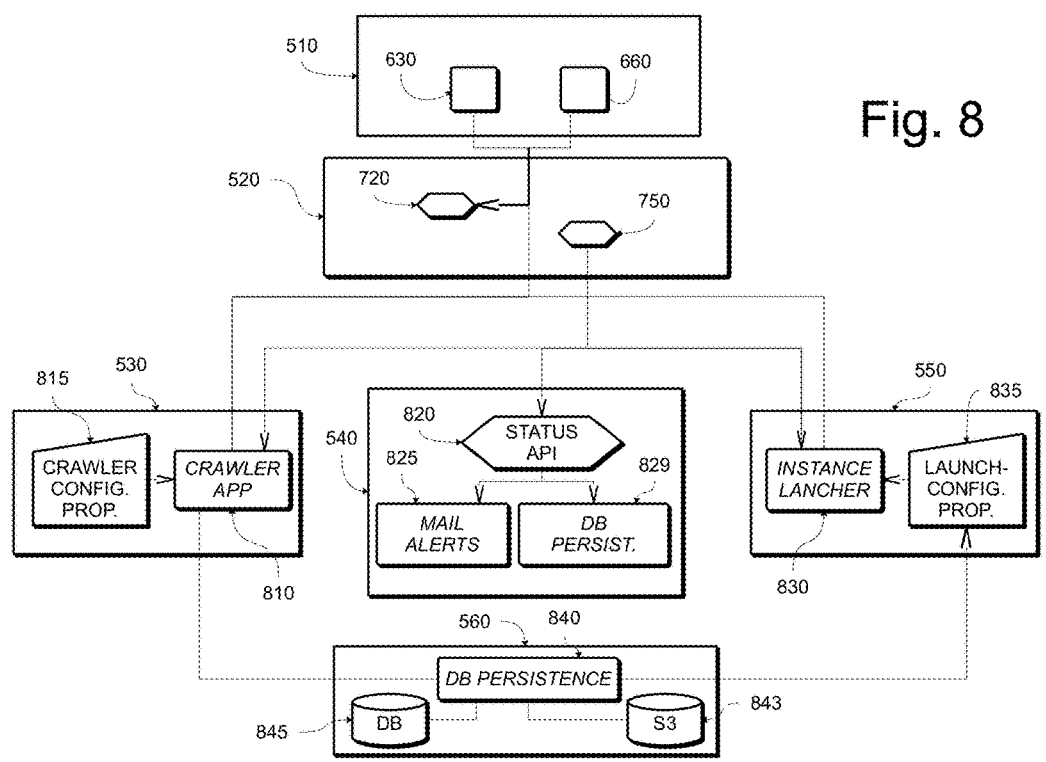
FIG. 8 is a block diagram representing components of a data collection crawling system further detailing the crawler process instantiation and management system, the instance launcher system, the status and alert process management system and the data input/output system in accordance with an embodiment of the invention.

FIG. 8 is a block diagram representing components of a data collection crawling system further detailing the crawler process instantiation and management system, the instance launcher system, the status and alert process management system and the data input/output system in accordance with an embodiment of the invention. The crawler system 530 comprises software component 810 that implement the crawling process i.e. the ability to send network requests and collect data. Many instances may be generated to execute simultaneously. Component 810 may utilize the crawler configuration properties 815 (e.g., from a give data source such as a text file).

The instance launcher 550 comprises software components 830 the execution of which allows for launching process instances, such as crawling process instances (from component 810). Instance launcher component 830 may utilize a launch configuration properties data source (e.g., instance launch configuration properties text file). As described above, an instance launch process is interfaced with the queue manager 520. A system embodying the invention is thus enabled to manage queues for instance launcher process instances.

The status and alert process management component 540 provides an API 820 the implementation of which enables access to communication component 825, such as messaging (e.g., electronic mail), and access to persistent storage (e.g., databases) through component 829.

The instance launcher is enabled to launch instances of the crawling process and the status and alert process. The Instance Launcher component obtains computing resources on which the request queuing, request construction, and request issuance processes can be instantiated and run. The Instance Launcher thus ensures that adequate computing resources of the appropriate nature are available, provisioned, and able to execute request processing steps. The Instance Launcher further attempts to optimize the availability of these computing resources in terms of cost by making judicious decisions regarding the type and number of computing resources made available.

The crawling process, status and alert components provide mechanisms to ensure request construction, issuance, and related processes run successfully, that failures are detected, and that corrective measures can be expeditiously taken if necessary, through evaluating defined conditions that constitute desired correct system behavior ("status") and notifying appropriate system components in case system behavior deviating from defined correct behavior is detected ("alerts").

The data input/output component 560 provides an API 840 that is when implemented (e.g., by crawler processes 810) enables access to persistent data storage (e.g., databases 845 and 843). API 840 may also be implemented to access configuration data (e.g., instance launcher configuration properties data).

Determining Audience Experience Attributes and Processing Collected Data

The invention enables a creator user to resolve specific steps, while producing new content, in order to achieve the goal of producing media content that is of interest to a target audience. The system provides a creator user with information such as what is a target audience watching at a given time, and what different kinds of content is appealing/relevant to the various audiences. For example, in order to address the latter, embodiments of the invention identify which content formats are succeeding with audiences in relation to a given industry, as would be input/selected by the user or otherwise suggested by an embodiment of the invention.

Figure 9:
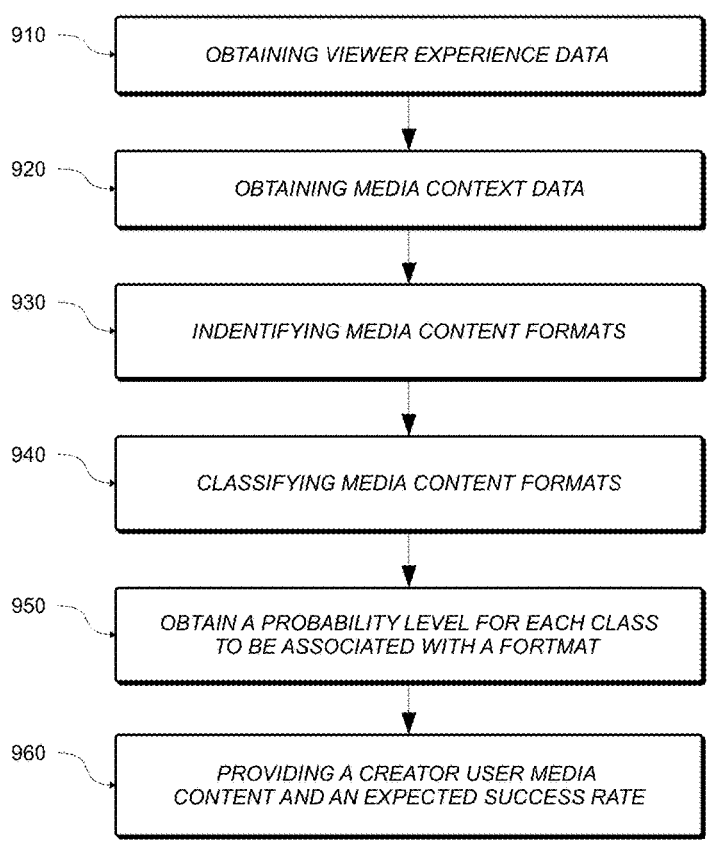
FIG. 9 is a flowchart diagram representing overall steps involved in processing collected data in order to identify and classify media content formats and provide the processed data to a creator user, in accordance with an embodiment of the invention.

FIG. 9 is a flowchart diagram representing overall steps involved in processing collected data in order to identify and classify media content formats and provide the processed data to a creator user, in accordance with an embodiment of the invention. At step 910, as described above, the data is collected from one or more data repositories. The data, which comprises user experience data, can be any data that may be collected from the user, be it the data is actively input by the user or measured by the systems that serve up the media content (e.g., number of times a media content is viewed, time spent on a web page, frequency of the visits, number of time a user shared a link to a media content etc.). At step 920, a system embodying the invention obtains the media content metadata.

At step 930, a system embodying the invention identifies the metadata of each of the media content on any given repository obtains classes of content formats. The content format of a video refers to the subtle intrinsic theme of the video examples of which include "how-to", "review", "parody", "unboxing", "commercials" etc. It is possible for a video to belong to multiple content formats at the same time.

At step 940, a system embodying the invention classifies the media content format data. User entered keywords of a video play a very important role in determining the reach of the video on a viewing audience. The content format(s) of a video are often directly embedded within its keywords, and/or it may be derived from other semantically relevant information available from the keywords. A set of classes is selected on the basis of all the keywords available.

At step 950, the collected data from an entire repository of media content data (e.g., from all videos collected from a website such as youtube.com) is processed, and a probability is computed in order to associate each media content data (e.g., video) with one or more classes of content formats.

Embodiments of the invention may implement methods for identifying and/or classifying the metadata using one or more automatic processes. The latter may involve using one or more machine learning methods.

At step 960, a system embodying the invention serves data to a creator user through a user interface that enables the user to traverse the data and search/select videos on the basis of the category/content format chosen.

Automated content format identification of videos involves the task of identifying the content format(s) of a video based on its metadata. As an example of automated content format identification, an embodiment of the invention utilizes a semi-supervised machine learning algorithm, by which, given a set of content formats (e.g., only the labels), all the necessary information about each of the content formats are learned automatically from the universe of a video repository such as "YouTube" videos which form the training set, and any input video is classified automatically into one or more content formats.

Figure 10:
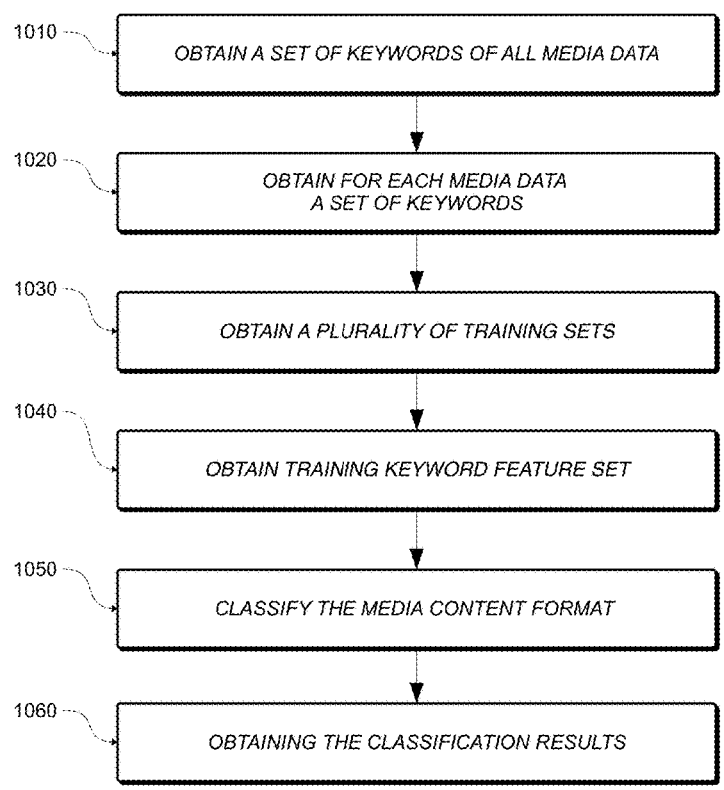
FIG. 10 is a flowchart diagram representing steps involved in classifying media data formats in accordance with an embodiment of the invention.

FIG. 10 is a flowchart diagram representing steps involved in classifying media data formats in accordance with an embodiment of the invention. At step 1010, the keywords from all media data are collected from a repository of media data.

Classification Function.

Let "C" be the set of content formats and "V" be the universe of media content (e.g., video clips) in a repository of media data (e.g., Youtube.com website). Let "γ" be the classification function as shown in equation (1)

$$\gamma: V \rightarrow 2^C \quad (1)$$

Metadata Representation.

At step 1020, the keywords are organized in subsets, each of which is associated with a particular media content. Let "K" be the set of all keywords associated with all the media content data (e.g., videos) in "V" and let "$K_v$" be the set of keywords of a given video v∈V. Note that, the union of all sets of all keywords is equal to the set of all keywords, as expressed in equation 2 as follows:

$$\bigcup_{v \in V} K_v = K \quad (2)$$

Training Set.

The algorithm may not be explicitly provided a human-created training set. The implementation of the algorithm creates the training set automatically from C and K.

At step 1030, the keywords data are processed in order to facilitate computation with the keyword data. For example, the system may convert characters into lower case format, remove non-alphanumeric characters from keyword strings or carry out any type of processing that may benefit the classification methods (e.g., increase execution speed). Let $\mathscr{L}_C$ denote the set of lowercase folded and non-alphanumeric characters removed version of the C, and let $\mathscr{L}_k$ denote the set of lowercase folded and non-alphanumeric characters removed version of keywords of K. Then the training set $T_c$ for a class C∈C whose label is $l_c \in \mathscr{L}_{Kc}$ is computed in accordance with equation (3), shown below.

$$T_c = \{k | k \in \mathscr{L}_{Kv} \wedge l_c \in \mathscr{L}_{Kv}\} \quad (3)$$

The function captures all the sets of keywords of videos for a given class where any keyword in the set matches its label. While it does not capture the set of keywords of videos that do not directly contain the label but have a semantically related keyword, the hypothesis is that the set of keywords that were captured would very likely have this semantically related keyword captured in it. Since this training set is generated over the universe V it is very likely that among the set of captured keywords, semantically related keywords are also present. A feature selection process discussed below would discard the insignificant keywords from this set.

Additionally let us define the set $D_c$ to denote the set of documents in the training set of the class C∈C as shown in equation (4).

$$D_c = \{v | v \in V \wedge l_c \in \mathscr{L}_{Kv}\} \quad (4)$$

Feature Selection.

At step 1040, a feature set containing the important set of keywords is selected. Since $T_c$ may contain many insignificant keywords, it's important to use an adequate set of keywords in order for the classification algorithm to work well. For each class c∈C, let $F_c$ denote the feature set containing the important set of keywords. $F_c$ is determined using mutual information.

Let "$\mathscr{X}$" be a random variable that takes values as follows:

$\mathcal{F} = e_k = 1$, if $k \in \mathcal{L}_{Kv}$ $\mathcal{F} = e_k = 0$, if $k \notin \mathcal{L}_{Kv}$ and let $\mathfrak{C}$ be a random variable that takes values as follows:

$\mathfrak{C} = e_c = 1$, if $v \in D_c$ $\mathfrak{C} = e_c = 0$, if $v \notin D_c$ Then the mutual information is obtained in accordance with equation (5), as show below.

$$I(\mathcal{F}, \mathfrak{C}) = \sum_{e_k=0}^{1} \sum_{e_c=0}^{1} P(\mathcal{F} = e_k, \mathfrak{C} = e_c) \ln \frac{P(\mathcal{F} = e_k, \mathfrak{C} = e_c)}{P(\mathcal{F} = e_k)P(\mathfrak{C} = e_c)} \quad (5)$$

which can be rewritten for maximum likelihood of the probabilities in accordance with equation (6), as shown below.

$$I(\mathcal{F}, \mathfrak{C}) = \quad (6)$$

$$\frac{N_{11}}{N}\ln\frac{NN_{11}}{N_1.N_{.1}} + \frac{N_{01}}{N}\ln\frac{NN_{01}}{N_0.N_{.1}} + \frac{N_{10}}{N}\ln\frac{NN_{10}}{N_1.N_{.0}} + \frac{N_{00}}{N}\ln\frac{NN_{00}}{N_0.N_{.0}}$$

Where, $N_{10}$ is the number of documents that contain the keyword $k(e_k=1)$ and are not in $c(e_c=0)$; Similarly $N_{01}$ is the number of documents that do not contain the keyword $k(e_k=0)$ but are in class $c(e_c=1)$; and so on, and, $N_{.1}=N_{10}+N_{11}$ and similarly for $N_{0.1}$, $N_{0.0}$ and $N_{0.0}$, and, $N=N_{00}+N_{01}+N_{10}+N_{11}$ $T_c$ is then updated with the results of $F_c$ as shown in equation (7)

$$T_c = T_c \cap \{k | k \in F_c \wedge I(k,c) \geq \lambda\} \quad (7)$$

where $\lambda$ designates a threshold value. For instance, in embodiments of the invention a threshold "$\lambda$" was obtained from empirical analysis, and its value set as follows:

$\lambda = 0.0001$

Content Format Classification.

At step 1050, the content format is classified. Let $\hat{P}(c|v)$ be the probability of a video $v \in V$ classified under $c \in \mathbf{C}$, then the traditional naive Bayes classification is obtained in accordance with equation (8), shown below.

$$\hat{P}(c|v) \propto \hat{P}(c) \prod_{k \in \mathcal{L}_{Kv} \cap T_c} \hat{P}(k|c) \quad (8)$$

where $\hat{P}(c)$ is the prior probability. For this task $\hat{P}(c)$ is set to 1 in order to treat all classes equally. It might appear counter-intuitive since in the traditional context of text-classification $\hat{P}(c)$ would not be set to 1. But in the context of a large repository (e.g., youtube.com website) some content formats are present in overwhelmingly large number compared to other formats (as confirmed in the empirical analysis). Assigning a prior probability would cause the classifier to have a bias favoring frequent content formats over the infrequent ones, which would affect the accuracy of the classification decision. Therefore the prior probability is ignored here. Hence, $\hat{P}(c|v)$ could be rewritten as shown in equation (9).

$$\hat{P}(c|v) = \prod_{k \in \mathcal{L}_{Kv} \cap T_c} \hat{P}(k|c) \quad (9)$$

However, in empirical analysis it was found that multiplying the conditional probabilities causes a bias in the classification where few features having very low score affect the overall score even when a majority of the features have strong scores. In order to avoid this, the geometric mean of the conditional probabilities is used instead of their product, causing the above equation to be rewritten as shown in equation (10).

$$\hat{P}(c|v) = \left(\prod_{k \in \mathcal{L}_{Kv} \cap T_c} \hat{P}(k|c)\right)^{\frac{1}{|\mathcal{L}_{Kv} \cap T_c|}} \quad (10)$$

The conditional probabilities $\hat{P}(k|c)$ are typically small values which might cause a floating-point underflow in the computation of the term on the right hand side. Since logarithm is monotonic function, applying product rule and power rule of logarithms $\hat{P}(c|v)$ could be rewritten as show in equation (11).

$$\hat{P}(c|v) = \frac{1}{|\mathcal{L}_{Kv} \cap T_c|} \sum_{k \in \mathcal{L}_{Kv} \cap T_c} \ln \hat{P}(k|c) \quad (11)$$

Computing the Conditional Probabilities.

$\hat{P}(k|c)$ is computed as shown in equation (12)

$$\hat{P}(k|c) = \frac{|\{v | v \in D_c \wedge K \in \mathcal{L}_{Kv} \cap T_c\}|}{|D_c|} \quad (12)$$

The denominator is the number of documents in class c and the numerator is the number of documents in class c containing the keyword k post feature selection.

Classification Results.

At step 1060, the result is computed. The best class c, that fits the input data is defined as shown in equation (13)

$$c_r = \underset{c \in C}{\mathrm{argmax}}\left(\frac{1}{|\mathcal{L}_{Kv} \cap T_c|} \sum_{k \in \mathcal{L}_{Kv} \cap T_c} \ln \hat{P}(k|c)\right) \quad (13)$$

Algorithm.

The steps of training a system embodying the invention as described above may be implemented by following, for example, the steps described in the pseudo-code below, Code Listing 1, using any adequate programming language.

Code Listing 1

```
Input: V, C
Output: P̂ (k|c) ∀ c∈C ∧ k ∈ T_c
1. for each v ∈ V
2. compute ℒ_Kv
3. for each c ∈ C
4. compute Dc, Tc
5. compute F c
6. λ ← 0.0001
7.    T_c ← T_c ∩ {k|k ∈ F_c ∧ I(k, c) ≥ λ}
8. for each c ∈ C
9. for each k ∈ Tc
10.       N_ck ← |{v|v ∈ D_c ∧ k ∈ ℒ_Kv ∩ T_c}|
11.    N_c ← | D_c |
12.
         P̂ (k | c) ← N_ck / N_c
13. return P̂ (k ∈ T_c|c ∈ C)
```

The steps of classifying the content formats by a system embodying the invention as described above may be implemented by following, for example, the steps described in the pseudo-code below, Code Listing 2, using any adequate programming language.

---
Code Listing 2
---

Input: Kv, C, $\hat{P}$ ($k \in T_c | c \in $ C)
Output: $c_r$
1. compute $\mathscr{L}_{Kv}$
2. $S_r \leftarrow -\infty$
3. $\omega \leftarrow 0.1$
4. or each $c \in $ C
5.     $\hat{P} \leftarrow 0$
6.     $i \leftarrow 0$
7.     for each $k \in \mathscr{L}_{Kv} \cap T_c$
8.        if $P(k|c) \geq \omega$ then
9.           $\hat{P} \leftarrow \hat{P} + \ln \hat{P}(k|c)$
10.           $i \leftarrow i + 1$ 11.     $S_r \leftarrow \max\left(\dfrac{\hat{P}}{i}, S_r\right)$ 12.     if $S_r \leftarrow \max\left(\dfrac{\hat{P}}{i}, S_r\right) = \dfrac{\hat{P}}{i}$ then 13.        $cr \leftarrow c$
14. return $c_r$.

---

In embodiments of the invention where multiple classes are desired in the output, the algorithm could be easily modified to return the classes in descending order of the respective $\hat{P}(c|v)$ scores to indicate the rank of membership in different classes. In such a case, it is advisable to set a reasonable threshold "λ" so as to discard showing membership in classes for which a $\hat{P}(c|v)$ value is too low. It is also important to note that it is possible that a media content (e.g., a video) may not be a member of any class. The latter may be indicated by a very low value of $\hat{P}(c|v)$, in which case the media content may be assigned to a special class e.g., "unclassified".

Figure 11:
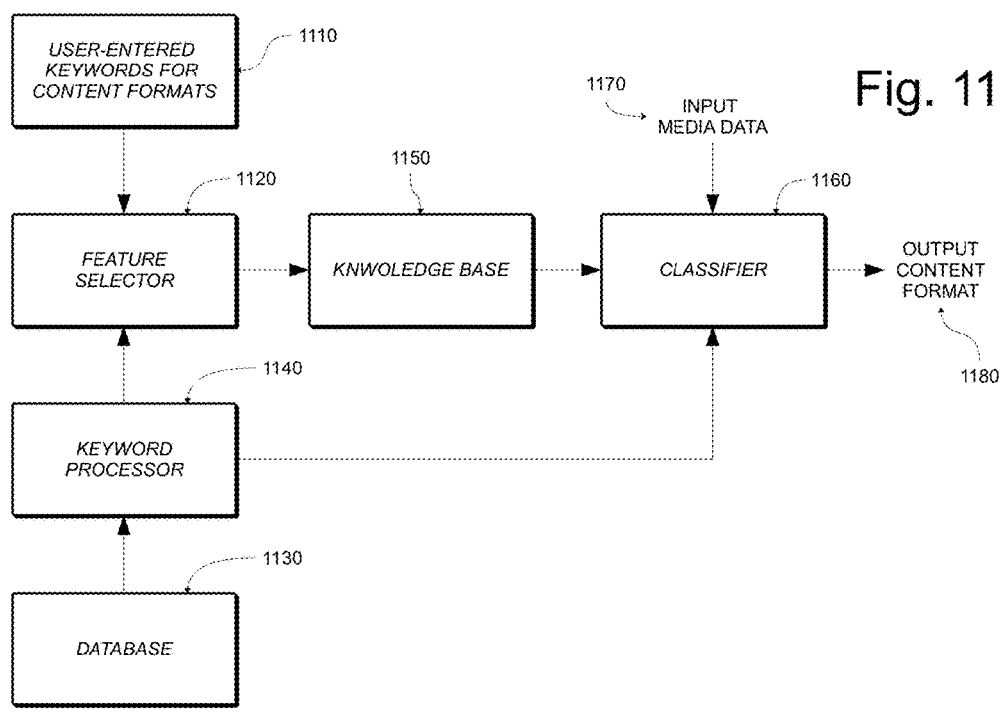
FIG. 11 is a block diagram representing components of system embodying the invention to classify media content according to a plurality of media content formats.

FIG. 11 is a block diagram representing components of system embodying the invention to classify media content according to a plurality of media content formats. Each component is a set of software and/or hardware components capable of processing data on behalf of users and communicate with users and/or with other components on the system.

Component 1110 enables the system to obtain user-entered data, which comprises keywords, labels, comment text or any other type of user-entered data. Component 1120 enables the system to select prominent features from the collected data. For example, as described above, a system embodying the invention may select sets of keywords that carry important information i.e. association with any give given content format.

Block 1130 represent one or more data sources for storing and retrieving keyword information. As described above, the stored keywords may be processed prior to classification. Block 1140 represents components of software that process the keyword data to facilitate usage of the keyword data. For example, component 1140 may convert text to lower case character, remove non-alphanumeric characters in order to facilitate text manipulation. With features selected and keywords available for classification, a knowledge base may be built. The latter may be carried out using a learning algorithm to build the means for classifying any future media data using any set of keywords associated with it. Block 1150 represent system component for building a and storing the knowledge base.

A system embodying the invention may receive input from a media content source (e.g., 1170). The input may be in a form of a query containing a set of keywords associated with a particular media data (e.g., video). Block 1170 represents system components for retrieving data from the knowledge base, for obtaining keyword set, and carrying out the classification of the input video to produce an output (e.g. 1180), which determines a class of the media content format associated with the input media data.

A system embodying the invention uses entropy for measuring purity of the data sets. The entropy of a sample of data indicates how mixed the class values are; the minimum value of 0 indicates that the sample is completely homogeneous, while 1 indicates the maximum amount of disorder. Given the input attributes A, the target attribute class set with size of c, and $p_i$ as the proportion/probability of S belonging to class i, the definition of entropy is specified as shown below in equation (14).

$$\text{Entropy}(S) = \sum_{i=1}^{c} -p_i \log_2 p_i \qquad (14)$$

Gain: The information gain for a feature F is calculated as the difference between the entropy in the segment before the split (S1), and the partitions resulting from the split as shown below in equation (15).

$$\text{Gain}(S, A) = \text{Entropy}(S) - \sum_{v \in Values(A)} \frac{|S_v|}{|S|} \text{Entropy}(S_v) \qquad (15)$$

Split Info: The split information value represents the potential information generated by splitting the training data set S into v partitions, corresponding to v outcomes on attribute A, may be obtained as shown below in equation (16).

$$\text{Splitinfo}(S, T) = - \sum_{v \in Values(T_S)} \frac{|T_{S,v}|}{|T_S|} * \log \frac{|T_{S,v}|}{|T_S|} \qquad (16)$$

High splitInfo: partitions have more or less the same size (uniform) Low split Info: few partitions hold most of the tuples (peaks)

Gain Ratio may calculated as shown below in equation (17):

$$\text{GainRatio}(S, T) = \frac{\text{Gain}(S, T)}{\text{Splitinfo}(S, T)} \qquad (17)$$

The attribute with the maximum gain ratio is selected as the splitting attribute.

A decision tree may be implemented using a program code that implements the steps described in the Code Listing 3, as show below.

Code Listing 3

```
If T is NULL then
    return failure
end if
if S is NULL then
    return Tree as a single node with most frequent class label in T
end if
if |S|=1 then
    return Tree as a single node S
end if
set Tree = { }
for a ∈ S do
    set Info(a,T)=0, and SliptInfo(a, T)=0
    compute Entropy(a)
    for v ∈ values(a, T) do
        set T_{a,v} as the subset of T with attribute a=v
```

$$\text{Info}(a, T) \mathrel{+}= \frac{|T_{a,v}|}{|T_a|} \text{Entropy}(a_v)$$

$$\text{SplitInfo}(a, T) \mathrel{+}= \frac{|T_{a,v}|}{|T_a|} \log \frac{|T_{a,v}|}{|T_a|}$$

```
end for
```

In the above code listing, Input variables may be media content parameters such as video title, description, keywords etc. The output may be the type of programming with classes "Hero", "Hub" or "Hygiene" (HHH, see below for detail). The data may be randomized and converted into a corpora (dictionary of documents). Using R capabilities, few text transformations are performed on corpora like converting all text to lowercase, removing all numbers, stop-words, punctuation marks, white spaces etc. Finally the corpora is converted to document term matrix (DTM). The term matrix may be split into several parts, such as one portion that is used for training (e.g., 80% of the data set), another portion used for validation (e.g., 10% of the data set) and, yet, another portion used for testing (e.g., 10% of the data set).

Figure 12:
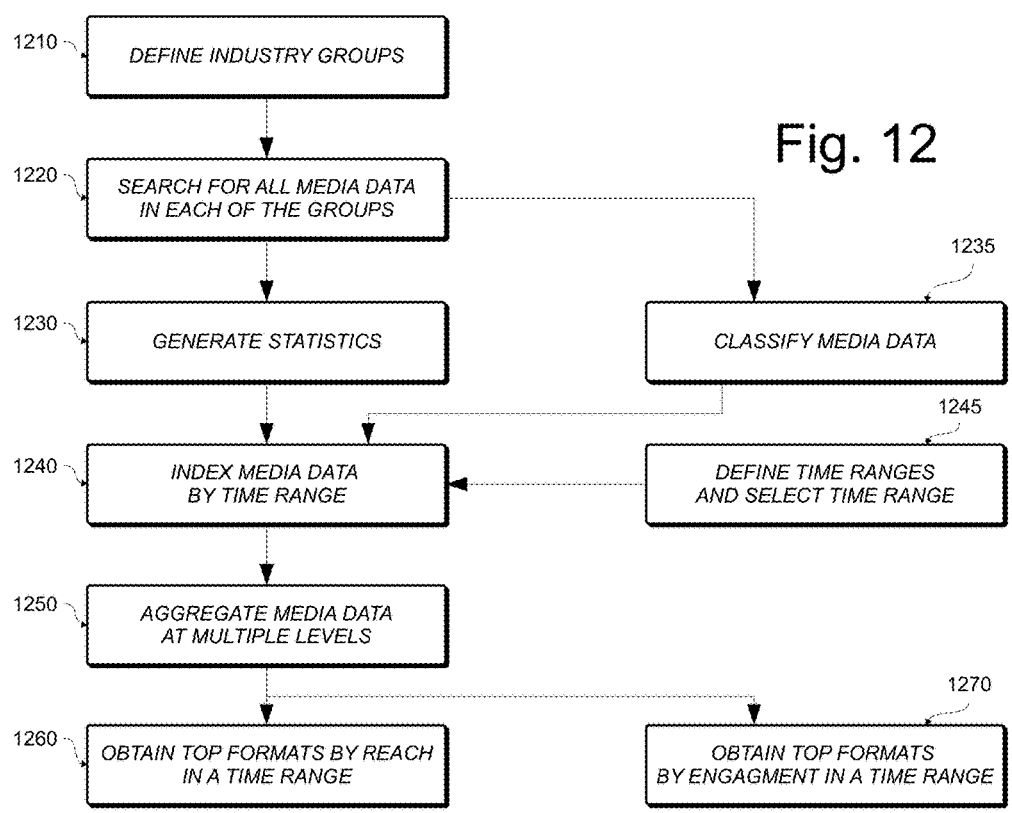
FIG. 12 is a flowchart diagram representing step for enabling a creator user to select content in time range of media content data in accordance with an embodiment of the invention.

FIG. 12 is a flowchart diagram representing steps for enabling a creator user to select content within a time range of media content data in accordance with an embodiment of the invention. Step 1210 represents the stage of processing of data collected to define industry groups. The latter allows a creator user to select a starting point to proceed to refining a search and the discovery of pertinent media content. Steps 1220 represents the execution of the computer program steps that search for all media in each of the groups selected by the user. Step 1230 represents the execution of program code that processes the search results and generates statistics for users viewing and further refinement of searches. Statistical data comprises any aggregate numbers that are based on the search results that may indicate information of the media content data itself, such as number of videos found in each category of data formats. The statistical data may indicate information about the viewers of the data (e.g., trending subjects). The statistical data may indicate an aggregate information about the general feedback of users (e.g., combined rating for each category by the users) or any other combination of data that may be informative to the creator user in the process of developing new content. Step 1235 represents the steps of classifying the results in accordance with the teaching of the invention as described above.

Step 1245 represents the stage of defining time ranges and selecting a time range. The latter may involve user input, e.g., through a user interface, may be determined by default in the system and/or may be calculated using the overall collected data and/or the search results obtained by taking into consideration the search parameters selected by the user. Step 1240 represents the indexing by time range of the search results. That latter is a basis for the user to ultimately select media content that time-relevant. Step 1250 represents the execution of program code that processes the search results in order to render the data accessible for viewing by a user. The data is represented on the basis of multiple parameters that may be of interest to the user, and presented in such a way that the user is able to easily drill-down in the search results and access information of the media content individually on a category by category basis or any other combination of parameters that may be of interest to the user in accessing the search results. As a result, as steps 1260 and step 1270 represent, the system enables the creator user to obtain information, based on the numbers, of the top formats by reach in a time range, and by engagement in a time range, respectively.

The flowchart of FIG. 12 is only a sample representation of the steps of processing data and presenting data to a creator user in one embodiment of the invention. The latter step may be implemented in a different order without deviating from the teaching of the invention. An embodiment of the invention provides information for a given industry. The system may search the space of all videos for which the data have been previously gathered and categorized. The system may present the processed data, such as video statistics, including the number of times the video has been viewed, the number of times viewers have expressed a positive (or negative) opinion and any other statistical data that may have been gathered for a set of videos in the chosen industry. The system may also detect the video format and present the result to the user. The user is further enabled to input a time range in order to assess the progression of the videos. The system then outputs the result of the aggregations of the statistical analyses. For example, the system may show the top formats by reach, in the time range selected, and/or the system may show the top formats by engagement in the time range selected.

The system enables creator users to produce media content relevant for a target audience by providing recommendations based on media context data and viewer data, which data are collected and classified, and the creator user is enabled with search tools and user interface tools to access information regarding user behavior data in relation to the media content. The system provides a creator user a multi-level aggregated statistical data; and a set of recommendation data based on a time-line of recommendations that enable the creator user to release a new media content at the most opportune time to a target audience. The latter recommendations comprise a set of topics of interest to viewers, a plurality of demographic attributes, such as age, sex and audience interest data of viewers, or any other demographic data. The system enables a creator user to obtain a break down of the demographic data of viewers, and to compare the statistical processing results of data from multiple data sources. A system embodying the invention may provide a recommendation to make media content in an area that is consistently performing with increasing success (e.g., relevancy of the timeliness of the media content). Moreover, the system may provide a recommendation to make media content in a category that lacks coverage.

Content Recipe

Embodiments of the invention provide the information of interest to the creator users in a form that allows them to easily access pertinent information. The latter is provided through a set of data, i.e. a content recipe, which allows the creator user to identify which content formats are performing well for the industry/domain, break the content formats down to a time-sliced window to identify patterns or emergence of patterns, obtain a detailed breakdown of which formats are rated well from a viewership and/or engagement standpoint, identify any emerging content format for which there is an increasing interest from a targeted audience, or obtain any other information from an aggregation of the detailed data.

An embodiment of the invention detects video formats. For example, each video could have multiple formats. A system according to the invention detects at least 120 different content formats. The system embodying the invention provides tools to the creator users to drill down into each content format, as identified using the content format identification technique algorithm described above, to understand why a given video succeeded (or failed) in the given time frame. Furthermore, the creator user is enabled with tools to understand which format has upward growth, as opposed to other formats that may be stagnating or going down.

To provide the later abilities, a system embodying the invention, detects the content formats for each video using a semi-automated method of keyword to content format mapping (e.g., mapped up to 50 million videos). The automated content format identification of videos involve the task of identifying the content format(s) of a video based on its metadata including, but not limited to, uploader specified keywords, video title, video description or any other attributes that be obtained either from the producer of the video, metadata associated by third party with the video, collected from audiences or any other type of metadata that may be associated with the video.

Figure 13:
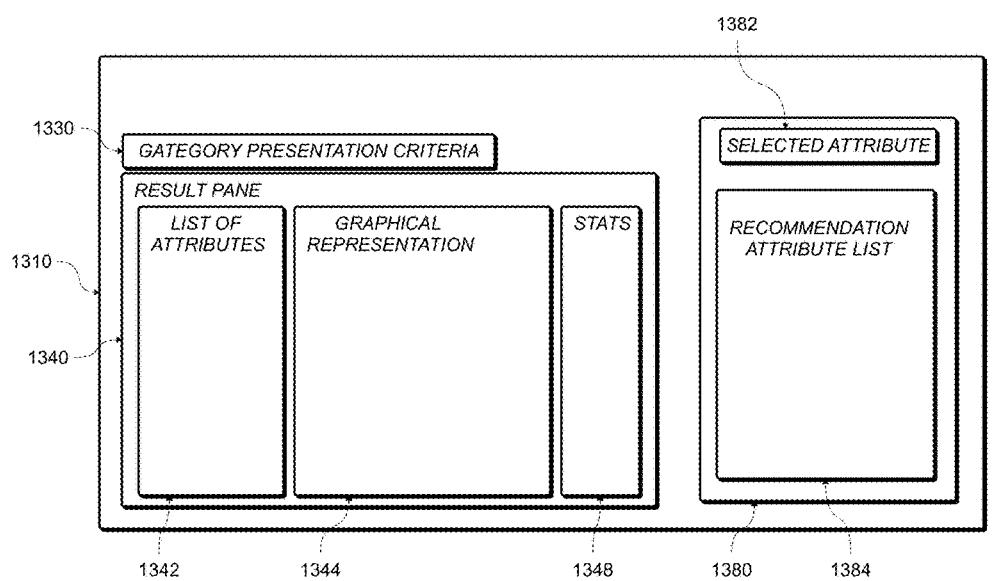
FIG. 13 represents components of a user graphical interface for enabling a user to interact with a system embodying the invention.

FIG. 13 represents components of a graphical user interface for enabling a user to interact with a system embodying the invention. Program components, as represented in FIG. 13, present data in a manner that allows a creator user to access pertinent information regarding videos in a selected category in relation with audience viewership. GUI components, as represented in FIG. 13 and other GUI representation in the disclosure, describe the general concept of the components and may not be implemented strictly as show in the disclosure. The latter components may be presented in separate views individually or in groups of two or more components. For example, depending on the size of the display screen, the complexity of the search results etc. the GUI components may be selected to convey (and/or capture) any information pertinent to the step of interaction with the user. GUI components may be built based on a hierarchical model, such that triggering one component (e.g., menu of items) may lead to the display of a set of related graphical components.

Figure 14:
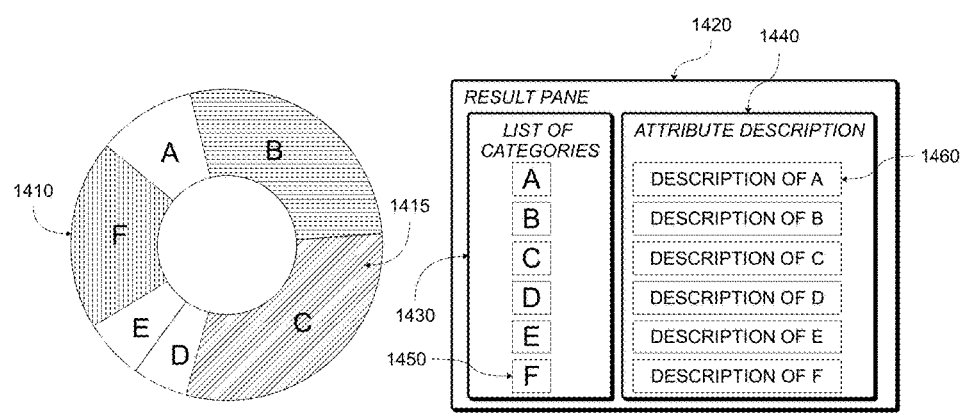
FIG. 14 represents components of a user graphical interface for enabling a user to further investigate the details of the statistical data and interact with a system embodying the invention.

FIGS. 13 and 14 show examples of data presentation, where the charts convey aggregate statistical data of success rate over a selected range of time (e.g., previous week) of media content in a given set of video categories. Graphical user interface (GUI) component 1310 represents an area (e.g., on display screen of a computer) that contains other components of the GUI. Component 1320 represents a GUI area (e.g., a pull-down menu) for allowing a user to select an industry (e.g., Beauty) from within a group of industries (e.g., Business, Sports, Entertainment, Politics, Science, Technology, Health, Disaster, Crime, Lifestyle, Celebrity, Beauty etc.). Component 1330 represents a GUI area for allowing a user to select one or more data presentation criteria. For example, the user may elect to view the results on the basis of the reach of the media content, or may elect to view the results on the basis of engagement.

Component 1340 represents a GUI area for displaying the results. Components 1342 may comprised within component 1340 and may present categories which have been characterized by the system based on the analysis of the overall data (as described above). For example, the selection by the user of option "Beauty" from component 1320 may trigger the system to display attributes, "Skin", "Hair", "Makeup", "DYI", "Commercials", "Inspirational", "Lip Makeup", "Eye Makeup", "Haul & Pickup", "Features & Review", "Blogs", "Celebrities & Stars", "Humor", "Fashion", "Experiments & Challenges", "Festivals & Occasions", etc. Component 1344 represents one or more GUI areas for graphically presenting statistical data for each of the entries presented in area 1342. Component 1348 represents one or more GUI areas for presenting statistical data as number corresponding to each of the entries in component 1342. Any of the components and/or data presented in the latter components may be accessible for selection by the user in order to further obtain data. For example, selecting an attribute (e.g., by a click of a computer mouse) may cause the system to display recommendation results on component 1380.

Component 1380 represents one or more GUI areas for presenting recommendation data. Component 1382 represents a GUI area that shows the attribute selected by the user, or automatically selected by the system on the basis of one or more statistical numbers (e.g. number of views). Component 1384 represents one or more GUI areas for presenting recommendation of attributes/categories which have been obtain by the system as most pertinent. For example, a trending category may be presented at the top of the list, along with other categories based on the rate of success with audiences.

For example, a category such as "Do It Yourself" (DIY) selected for viewing, may cause the display of a list of increasing trend of popularity of attributes such as "Auburn Hair", "Cosmetics", "Stop Motion", "Clinique", "Pimple", "Color", "Mask etc.

FIG. 14 represents components of a user graphical interface for enabling a user to further investigate the details of the statistical data and interact with a system embodying the invention. FIG. 14 shows an example of data presentation that allows a creator user to access pertinent information regarding videos in a selected category in relation with audience viewership. In FIG. 14, the statistical data is represented (on the left) in a simple graphics that is interactive i.e. the user may select any portion of the graphic to easily access data associated with the media format. Component 1410 represents one or more GUI components to represent the categories as a pie chart. Each category (e.g., block 1415) may have a size indicative of a statistical data entry. Component 1420 represents one or more GUI components for viewing textual description of the data. For example, component 1430 may present the list of attributes as presented in component 1410, and may be made graphically distinguishable for user's convenience (e.g., Color coding of attributes). A User may then select one or more entries (e.g., 1450) in the list of attribute either in component 1410 or of on the list of components 1430. The system may display the results as entries in a separate view which the sane of a different viewing component of the GUI. Component 1460 represents one or more GUI areas for display detailed results in relation to a one or more attributes. The data presented in components 1460 comprise statistical data (e.g., aggregate numbers from analysis), predictive numbers or any other type of pertinent data for the user. FIG. 14 shows an example of iconic representation of relevant videos allowing a creator user to access pertinent information regarding videos in a selected category in relation with audience viewership. FIG. 14 show graphical components that allow a user to determine the pertinence of each video in a glance. The system may provide various access functionality, such as to allow the user to directly view (or preview) the video, view metadata of a selected video or perform any other interaction with the system that allows for accessing the raw data and/or processed data.

Identification of Future Successful Content

It is common for media outlets (e.g., video streaming websites) to provide an area where the audience users are able to enter their own content, such as written opinion, an approval point, which is typically provided by clicking on an interface button (e.g., "likes") or assigning a level of approval (e.g., number of stars), providing a hyperlink to other web content, uploading media to share with other audience users or take any action that is related to the media that has been viewed. The latter audience users content is available on the world wide web, and can be accessed, gathered and analyzed.

Embodiments of the invention, provide a recommendation engine, that finds all the discussions happening amid a target audience on all social media platforms, and deduces select topics of interest to audiences of video. The result is that the system may recommend the attribute(s) a new media content may have to increase the probability of success when the content is produced at the opportune time. The latter is enabling in at least the following areas: a) build a successful programming strategy depending on the trends within an appropriate time to market; and b) build a database to gauge what content format for which category works for the targeted audience, during which time.

Figure 15:
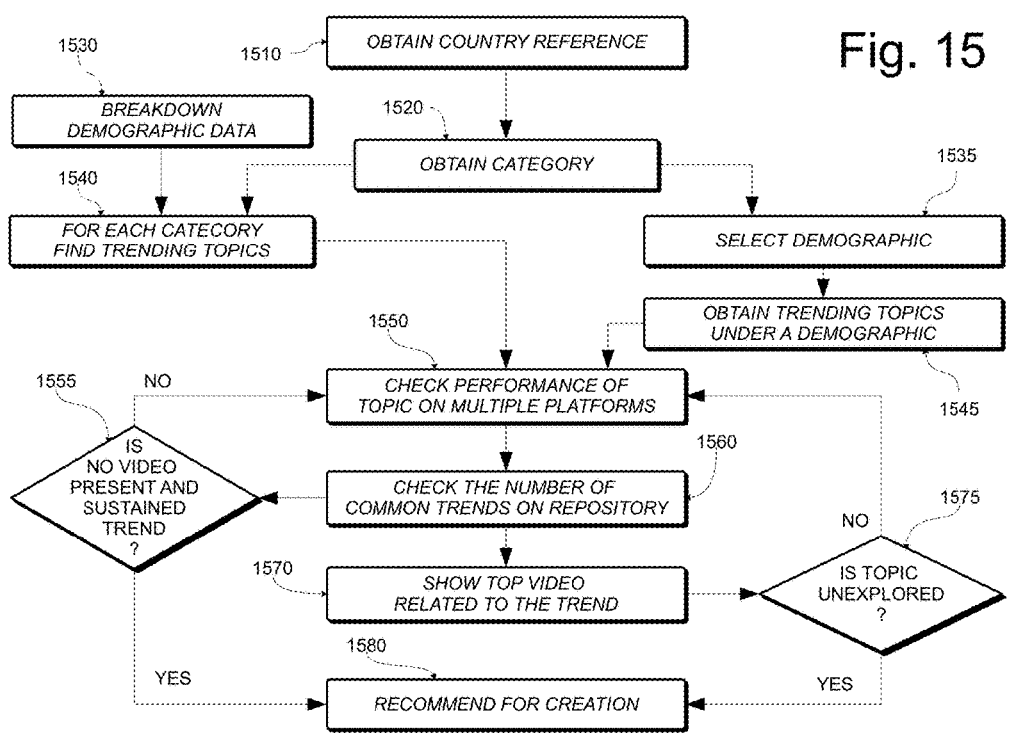
FIG. 15 is a flowchart diagram representing steps of data processing an embodiment of the invention undertakes to start from raw data to making a probability assessment to recommend a media content.

FIG. 15 is a flowchart diagram representing steps of data processing an embodiment of the invention undertakes to start from raw data to making a probability assessment to recommend a media content. A system embodying the invention may define geographical areas (e.g., step 1510), then select the raw data obtained for that geographical area. An embodiment of the invention may also gather a data set and determine the geographical area concerned with the data. The system may define categories of interest areas (e.g. step 1520), such as business, sports, politics, technology, health or any other topic of interest for audiences. The system may determine from the data which topics are increasing in interest for audiences (e.g., step 1540). The system may determine a plurality of demographic attributes (e.g., at step 1530), such as age, sex, audience interest (determined from their online activities) or any other data that may be deduced from the users' online activity. The system may produce a break down of the statistics of the demographic data for each of the categories (e.g., step 1530). The system may also obtain a list of demographic data (e.g., at step 1535), then obtain trending topics under each of the demographic categories (e.g., at step 1545).

The system compares the statistical processing results of data from multiple data sources, for example, from several social media websites (e.g., at step 1550). The system may find the top performing video(s) of any category (e.g., at step 1560). The system may provide recommendation to make media content in the area that is consistently performing with increasing success (e.g., at step 1560). The system may alternatively recommend creating media content in a category that is lacking coverage. For example, if there is no media content in a topic that is showing an interest from viewers (e.g., at step 1555), the system may recommend making a new video about the topic (e.g., at step 1580). If a topic is determined to be unexplored (e.g., at step 1575), the system may also recommend making a new video (e.g., at step 1580).

Figure 16:
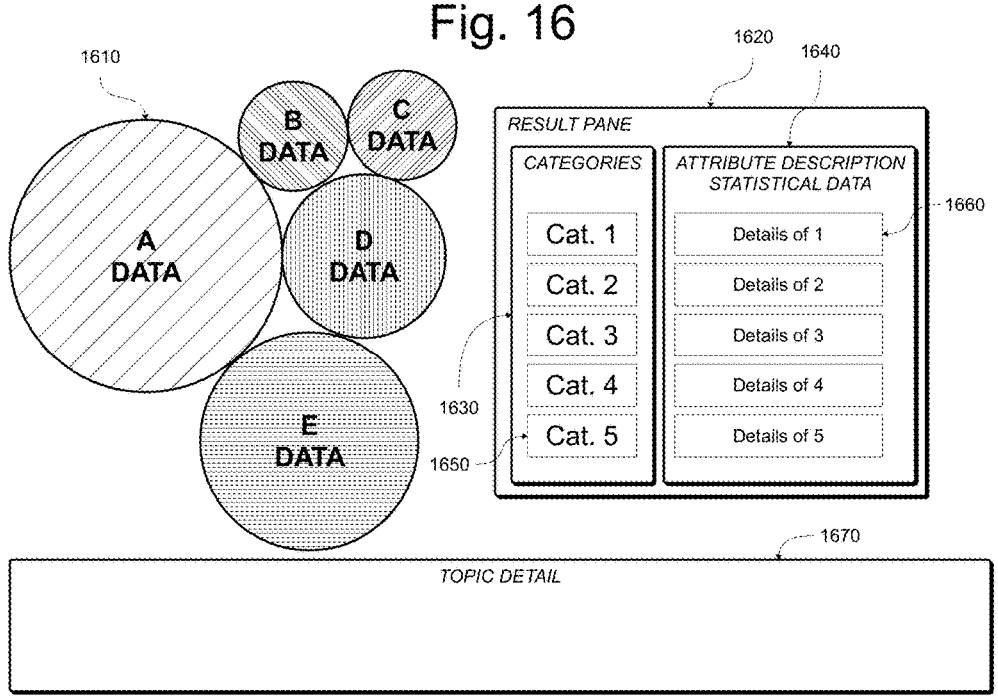
FIG. 16 represents a user interface to present the data to a creator user and allow the user to interact with the system to drill down through the data, provide input data and/or trigger the system to further carry out specific processing steps in accordance with an embodiment of the invention.

FIG. 16 represents a user interface to present the data to a creator user and allow the user to interact with the system to drill down through the data, provide input data and/or trigger the system to further carry out specific processing steps in accordance with an embodiment of the invention. Component 1610 represents GUI elements that graphically represents data, such that in a glance a user is able to view the name of the component (e.g. country name A, B, C, D etc.), and aggregate statistical data, such as country viewership data and/or contributions. Component 1620 represents one or more GUI area where further statistical data may be displayed in more detail. For example, when a user selects a country name by selecting the corresponding circle on the left (e.g., A, B, C, D etc.), the system displays a list of categories (e.g., 1650) (e.g., Business, Sports, Entertainment, Politics, Science, Technology, Health, Disaster, Crime, Lifestyle, Celebrity, Beauty etc.) in component 1630. Component 1640 represents one or more GUI areas for displaying a plurality of detailed descriptions and statistical data (e.g., 1660), such as raw aggregate numbers, percentage of viewership etc.

Moreover, component 1670 represents one or more GUI areas for presenting any number of item specific information. For example, when a country is concerned with the information presented in the GUI represented in FIG. 16, component 1670 may show information about local holidays, and provide details about holidays.

Audience Relationship Management

In an ongoing production of media by a creator or a group of creators (e.g., as marketing strategy in support of a particular product brand), the creators need to maintain a set of strategic actions for making media content available. Strategic audience management actions are to keep the media content: 1) regular, 2) frequent, 3) varied and 4) episodic (e.g. one video should encourage an audience to view another video).

Another aspect of managing audience relationship for the creators to provide media content that interest the target audience, which may be referred as "hygiene", provide content regularly to keep contact with the audience, which may be referred as "hub", and provide a type of media content that targets a wide audience, which may be referred as "hero". The latter strategy may be referred with the abbreviated word "HHH".

In keeping with the HHH strategy, embodiments of the invention enable creator users with a time-line of recommendations (e.g., calendar) using the time-slicing recommendations (as described above). The benefits of the latter time-line are numerous. For example, creators are enabled to program releasing content on a regular basis at a frequency that optimizes the success of each release of media content; creators are encouraged to maintain a programming calendar discipline by knowing the optimal time and the subject to create media content; creators are enabled to receive alerts when other creators are creating successful content in any category of a set of categories; creators are enabled to identify the formats with a potential to achieve success in any of the above strategic actions.

An embodiment of the invention identifies each media content and classify the media content in accordance to the strategic actions achieved by the media content.

Figure 17:
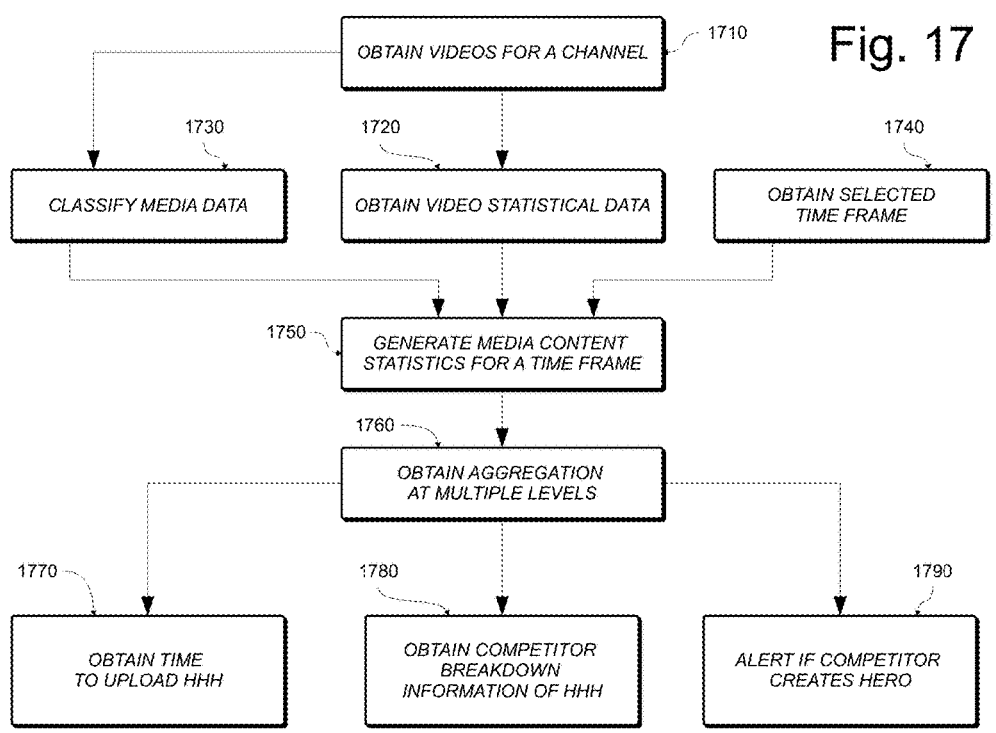
FIG. 17 is a flowchart diagram representing steps of processing data and presenting data to a creator user in accordance with embodiments of the invention.

FIG. 17 is a flowchart diagram representing steps of processing data and presenting data to a creator user in accordance with embodiments of the invention. A system embodying the invention may search the space of all videos for which the data have been previously gathered and categorized (e.g., at step 1710). The system may obtain data, such as video statistics, including the number of times the video has been viewed, the number of times viewers have expressed a positive (or negative) opinion and any other statistical data that may have been gathered for a set of videos in the chosen industry (e.g., at step 1720). The system may also detect the video media content format and classify the content in any of the HHH strategy actions (e.g., at step 1730). The user is further enabled to input a time range in order to assess the progression of the videos (e.g., at step 1740). The time range may also be calculated on behalf of the user. For example, the time range may be schedule on the regular frequency, such that data are processed and made available to the user. The time range may be computed as a result of specific events, such as the upload of a new media content by any given, or any other event that a user may determine to be pertinent.

The system obtains aggregation of statistical data at multiple for communication with the user (e.g., at step 1760). At step 1770, the system determines a time to upload a media content in the context of HHH. At step 1780, the system may obtain a competitor's breakdown information in the context of HHH, and communicate the information to a creator user. At step 1790, the system may create specific alerts when, for example, a competitor creates a media content in the context of "Hero" (as described above).

The system embodying the invention obtains media content statistics for the time range obtained from the user. The system is enabled to select time ranges for which further processing of data is carried out. The system then outputs the result of the aggregations of the statistical analyses. For example, the system may show the most opportune time to present a given media to an audience, the system may present detailed analysis of the media presented by competitors, and the system may present alerts to specific media content formats.

FIG. 18 represents a user interface to present the data to a creator user and allow the user to interact with the system to obtain recommendations in the context of "Hero", "hub" and "Hygiene", in accordance with an embodiments of the invention. Component 1800 represents a GUI content display for presenting the HHH recommendation. The latter may display entries for "Hero", "hub" and "Hygiene", on separate axes, such as rows 1810, 1820 and 1830, respectively. The horizontal axis represents time 1840, and may be bound by the time range selected by the user.

Thus, a method, system and apparatus capable of collecting data from a plurality of repositories of media content data. The repositories serve the media content data to users (viewers), viewership data is collected and processed. Embodiments of the invention provide data collection, data processing and recommendations to creative users to create new media content.

What is claimed is:

1. A method for collecting audience data from a network, said method is embodied as computer program code that is executed in a system of networked computers and causes said system to crawl said network, retrieve and manage audience data, said method comprising the steps of:
   collecting viewer experience data of a plurality of media content from a plurality of data sources using a crawler;
   collecting media context data for said plurality of said media content from a plurality of media context sources;
   serving said viewer experience data and said media context data to a processing server;
   identifying by said processing server a plurality of media content formats by classifying into a set of classes said plurality of media context data;
   obtaining a probability of success for each class of said set of classes using said viewer experience data; and
   providing a creator user at least a portion of a media content and an expected success rate based on said viewer experience data.

2. The method of claim 1, wherein said collecting said viewer experience data further comprising collecting said viewer experience data from a client-side plugin-based computer program.

3. The method of claim 2 further comprising providing a target-specific computer program that implements said client-side plugin-based computer program enabled for executing on a target operating system.

4. The method of claim 1 further comprising collecting all metadata about all videos present in a digital media repository.

5. The method of claim 1 further comprising collecting user activity data from a plurality of data sources.

6. The method of claim 5 further comprising collecting said user activity data from a plurality of contributed activity data on online user groups.

7. The method of claim 6 further comprising collecting said user activity data in real-time as viewers retrieve the media content and provide feedback data.

8. The method of claim 7, wherein said collecting said user activity data, further comprising storing said user activity data and said feedback data for subsequent retrieval.

9. The method of claim 1 further comprising providing recommendation data to a creator user to generate new content.

10. The method of claim 9 further comprising recommendation data to said creator user about the content a target audience is watching.

11. The method of claim 1, wherein said step of identifying by said processing server said plurality of media content formats further comprising collecting said media content's metadata.

12. The method of claim 11 further comprises obtaining a set of keywords embedded in said media content.

13. The method of claim 11 further comprises obtaining a set of keywords from other semantically relevant information available from a set of associated keywords.

* * * * *